United States Patent
Fonoberova et al.

(10) Patent No.: US 12,535,788 B2
(45) Date of Patent: Jan. 27, 2026

(54) LIFTED PREDICTIVE MODELING AND CONTROL FOR DIGITAL TWIN SYSTEM OPTIMIZATION

(71) Applicant: AIMDYN, Inc., Santa Barbara, CA (US)

(72) Inventors: Maria Fonoberova, Santa Barbara, CA (US); Allan Avila, Minneapolis, MN (US); Alan Cao, Santa Barbara, CA (US); Ryan Mohr, Santa Barbara, CA (US)

(73) Assignee: AIMDYN, Inc., Santa Barbara, CA (US)

( * ) Notice: Subject to any disclaimer, the term of this patent is extended or adjusted under 35 U.S.C. 154(b) by 557 days.

(21) Appl. No.: 17/843,820

(22) Filed: Jun. 17, 2022

(65) Prior Publication Data

US 2023/0408997 A1   Dec. 21, 2023

(51) Int. Cl.
*G05B 19/04*    (2006.01)
*G05B 19/042*   (2006.01)
*G06N 3/045*    (2023.01)
*H04L 12/40*    (2006.01)
*G06N 3/08*     (2023.01)

(52) U.S. Cl.
CPC ..... *G05B 19/0423* (2013.01); *G05B 19/0426* (2013.01); *G06N 3/045* (2023.01); *H04L 12/40* (2013.01); *G06N 3/08* (2013.01); *H04L 2012/40215* (2013.01)

(58) Field of Classification Search
CPC ............ G05B 19/0423; G05B 19/0426; G05B 19/042; G06N 3/045; G06N 3/08; H04L 12/40; H04L 2012/40215
See application file for complete search history.

(56) References Cited

U.S. PATENT DOCUMENTS

| | | | |
|---|---|---|---|
| 2015/0212119 A1* | 7/2015 | Mezic | G05B 15/02 702/60 |
| 2018/0257683 A1* | 9/2018 | Govindappa | B61L 27/57 |

(Continued)

OTHER PUBLICATIONS

Hassan Arbabi. Introduction to Koopman Operator Theory of Dynamical Systems. Published Jan. 2020. Available at https://www.mit.edu/~arbabi/research/KoopmanIntro.pdf (Retrieved May 5, 2022).

(Continued)

*Primary Examiner* — Christopher W Carter

(57) ABSTRACT

Various of the disclosed embodiments provide systems and methods for creating, deploying, and monitoring "lifted" controller systems able to operate in challenging environments expressing complicated dynamics. These controller systems may employ operator-based approaches, such as the Koopman Operator, to represent the system's complicated dynamics. Such improved representations may facilitate a variety of benefits, such as longer prediction horizons, more effective system predictions, and improved controls. Exemplary controllers suitable for managing both electromechanical systems, such as vehicles, as well as controllers suitable for managing resource allocation systems, such as healthcare networks, are disclosed. Variations and miscellaneous improvements to the creation, operation, and management of the "lifted" controller systems are likewise provided.

26 Claims, 15 Drawing Sheets

(56) References Cited

U.S. PATENT DOCUMENTS

| | | | |
|---|---|---|---|
| 2019/0377306 A1* | 12/2019 | Harvey | G05B 13/027 |
| 2019/0387223 A1* | 12/2019 | Uejima | H04N 19/11 |
| 2022/0258751 A1* | 8/2022 | Dane | H04W 4/48 |
| 2024/0320505 A1* | 9/2024 | Balakrishnan | G06N 3/08 |

OTHER PUBLICATIONS

William T. Redman, Maria Fonoberova, Ryan Mohr, Ioannis G. Kevrekidis, Igor Mezic. An Operator Theoretic View on Pruning Deep Neural Networks. Published Oct. 28, 2022. Available at https://arxiv.org/pdf/2110.14856v1.pdf (Retrieved May 5, 2022).

Jonathan H. Tu, Clarence W. Rowley, Dirk M. Luchtenburg, Steven L. Brunton, J. Nathan Kutz. On Dynamic Mode Decomposition: Theory and Applications. Published Nov. 29, 2013. Available at https://arxiv.org/pdf/1312.0041.pdf (Retrieved May 5, 2022).

Milan Korda, Igor Mezic. Linear Predictors for Nonlinear Dynamical Systems: Koopman Operator Meets Model Predictive Control. Published Mar. 23, 2018. Available at https://arxiv.org/pdf/1611.03537.pdf (Retrieved May 5, 2022).

Ryan Mohr, Igor Mezic. Koopman Spectrum for Cascaded Systems. Published Aug. 1, 2017. Available at https://arxiv.org/pdf/1705.06790.pdf (Retrieved May 5, 2022).

Naoya Takeishi, Yoshinobu Kawahara, Takehisa Yairi. Learning Koopman Invariant Subspaces for Dynamic Mode Decomposition. Published Jan. 30, 2018. Available at https://arxiv.org/pdf/1710.04340.pdf (Retrieved May 5, 2022).

Bethany Lusch, J. Nathan Kutz, Steven L. Brunton. Deep Learning for Universal Linear Embeddings of Nonlinear Dynamics. Published Apr. 13, 2018. Available at https://arxiv.org/pdf/1712.09707.pdf (Retrieved May 5, 2022).

Daniel Bruder, Brent Gillespie, C. David Remy, Ram Vasudevan. Modeling and Control of Soft Robots Using the Koopman Operator and Model Predictive Control. Published Jul. 1, 2019. Available at https://arxiv.org/pdf/1902.02827.pdf (Retrieved May 5, 2022).

Yunzhu Li, Hao He, Jiajun Wu, Dina Katabi, Antonio Torralba. Learning Compositional Koopman Operators for Model-Based Control. Published Apr. 27, 2020. Available at https://arxiv.org/pdf/1910.08264.pdf (Retrieved May 5, 2022).

Akshunna S. Dogra and William T. Redman. Optimizing Neural Networks via Koopman Operator Theory. Published Oct. 22, 2020. Available at https://arxiv.org/pdf/2006.02361.pdf (Retrieved May 5, 2022).

Igor Mezic, Koopman Operator, Geometry, and Learning. Published Oct. 12, 2020. Available at https://arxiv.org/pdf/2010.05377.pdf (Retrieved May 5, 2022).

Igor Mezic, Koopman Operator, Geometry, and Learning of Dynamical Systems. Published 2021 (public submission made prior to May 2021). Available at https://www.ams.org/journals/notices/202107/rnoti-p1087.pdf (Acquired May 5, 2022).

Enoch Yeung, Soumya Kundu, Nathan Hodas. Learning Deep Neural Network Representations for Koopman Operators of Nonlinear Dynamical Systems. Published Nov. 17, 2017. Available at https://arxiv.org/pdf/1708.06850.pdf (Retrieved May 5, 2022).

Qianxiao Li, et al. Extended Dynamic Mode Decomposition with Dictionary Learning: A Data-Driven Adaptive Spectral Decomposition of the Koopman Operator. Published Jul. 2, 2017. Available at https://arxiv.org/pdf/1707.00225.pdf (Retrieved May 5, 2022).

Iva Manojlovic, et al. Applications of Koopman Mode Analysis to Neural Networks. Published Jun. 21, 2020. Available at https://arxiv.org/pdf/2006.11765.pdf (Retrieved May 5, 2022).

Allan M. Avila, et al. Game Balancing using Koopman-based Learning. Published May 2021 (public submission made prior to May 2021). Available at https://web.ece.ucsb.edu/~hespanha/published/Gamebreaker_2021ACC.pdf (Acquired May 5, 2022).

Ryan Mohr, et al. Predicting the Critical Numbers of Layers for Hierarchical Support Vector Regression. Published Dec. 21, 2020. Available at https://arxiv.org/pdf/2012.11734v1.pdf (Retrieved May 5, 2022).

Akshunna S. Dogra, William Redman. Optimizing Neural Networks via Koopman Operator Theory. Published 2020. Avaialble at https://proceedings.neurips.cc/paper/2020/file/169806bb68ccbf5e6f96ddc60c40a044-Paper.pdf (Acquired May 5, 2022).

Diederik P. Kingma and Jimmy BA. Adam: A method for stochastic optimization. Published Dec. 22, 2014. Available at https://arxiv.org/pdf/1412.6980.pdf (Retrieved Jun. 15, 2022).

* cited by examiner

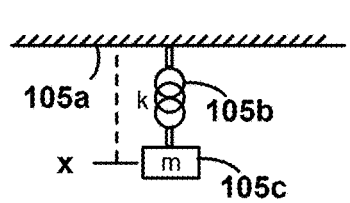
*FIG. 1A*
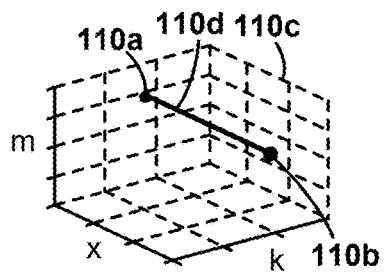
*FIG. 1B*
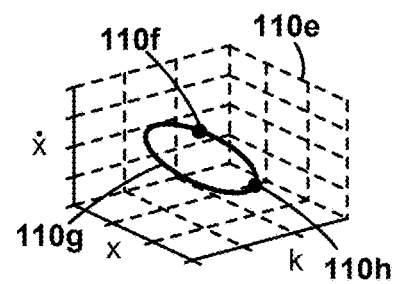
*FIG. 1C*
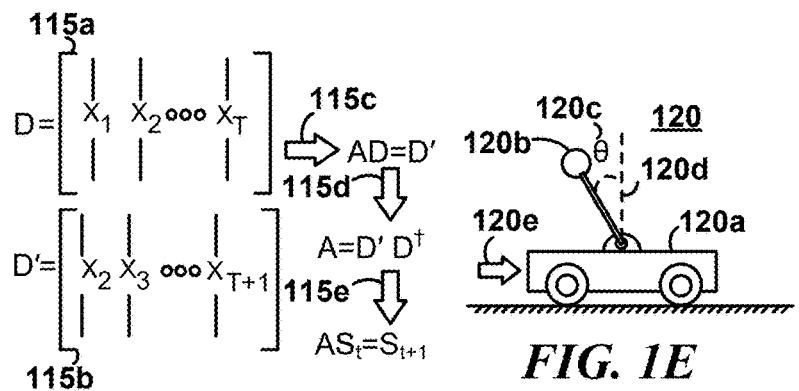
*FIG. 1D*
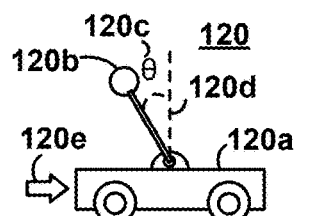
*FIG. 1E*
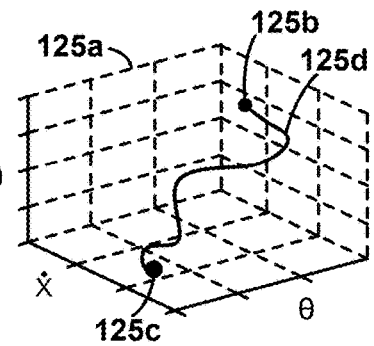
*FIG. 1F*
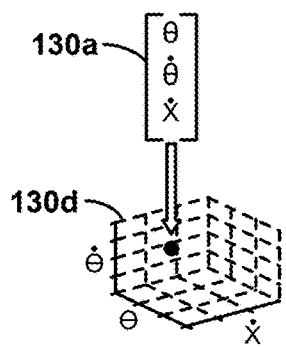
*FIG. 1G*
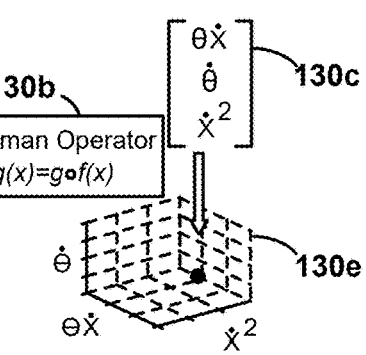
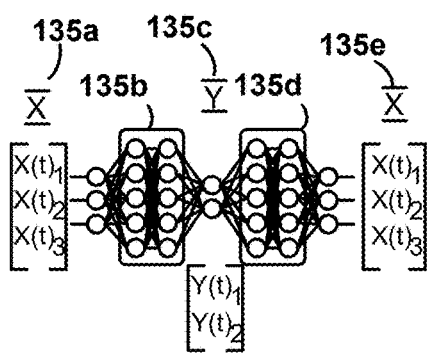
*FIG. 1H*
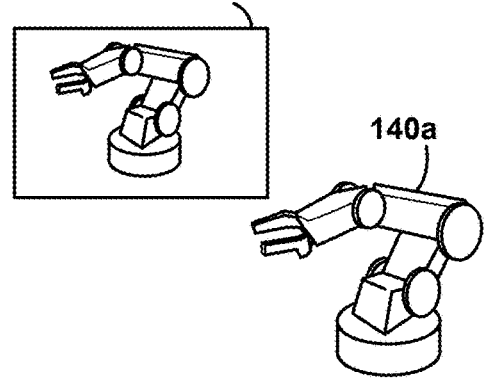
*FIG. 1I*

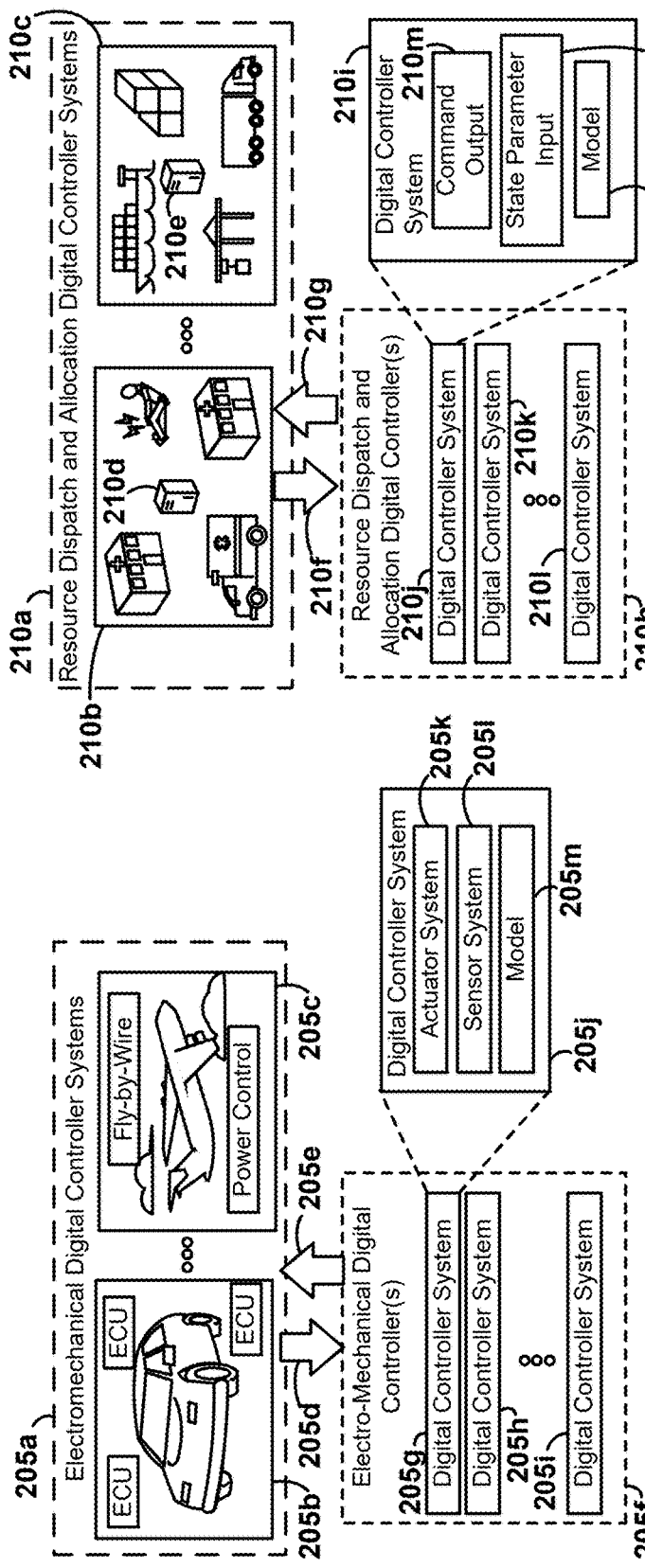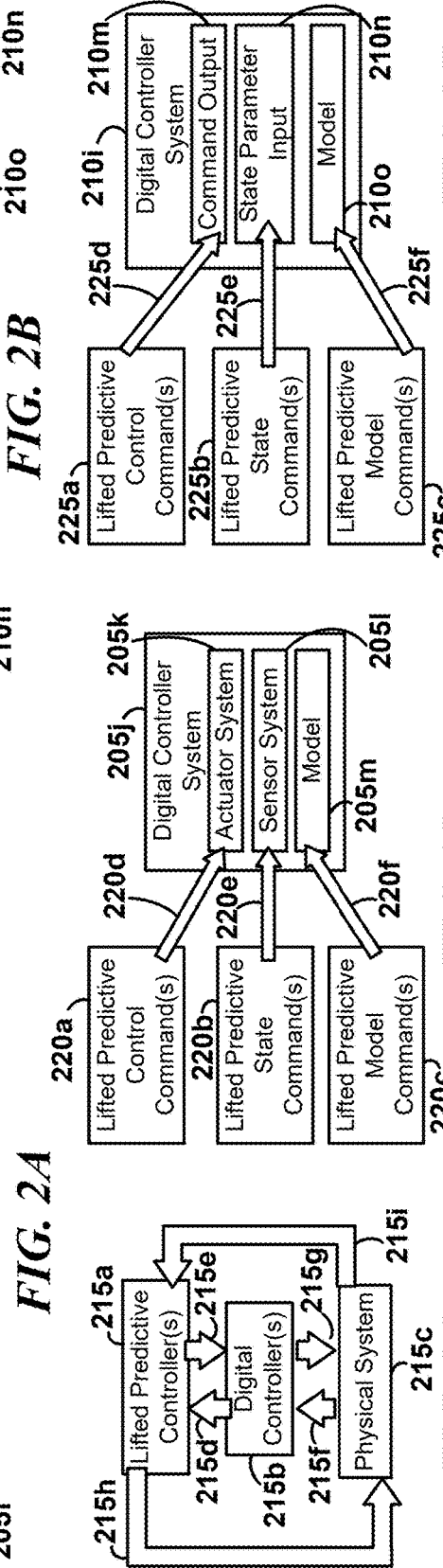

LIFTED PREDICTIVE MODELING AND CONTROL FOR DIGITAL TWIN SYSTEM OPTIMIZATION

GOVERNMENT LICENSE RIGHTS

This invention was made with government support under Prime Agreement No. HR 00112190047, awarded by the Defense Advanced Research Projects Agency (DARPA), and under Contract No. W31P4Q-21-C-0007 awarded by Army Contracting Command-Redstone. The government has certain rights in the invention.

TECHNICAL FIELD

Various of the disclosed embodiments relate to computer systems and computer-implemented methods for creating, operating, and maintaining lifted digital controllers.

BACKGROUND

Systems-level computer-assisted modeling and control have provided numerous benefits, both as to electromechanical systems (e.g., vehicle engines, robotic tools, etc.) as well as to various predictive management and monitoring systems (e.g., financial markets, healthcare systems, etc.). Unfortunately, many of these modeling and control approaches are limited in their ability to characterize systems having complicated dynamics. Specifically, the majority of systems, both in nature and in engineering, manifest dynamics not readily amenable to a linear representation. As many controls and modeling solutions are constrained to such linear representations, or at least operate most efficiently upon such linear representations, this limitation imposes a severe handicap upon future improvements to the electromechanical, predictive management, and monitoring systems referenced above.

In particular, increases in computational speed and complexity have made these limitations increasingly manifest. Systems, such as high-speed financial trading, vehicular control systems, etc., may undergo state changes on the order of milliseconds (or less) within complex, high-dimensional state spaces. An existing approach's failure to properly characterize or control such systems may have devastating consequences. Absent technologies facilitating appropriate characterization for prediction and control of such systems, existing progress may be stymied, and the novel risks imposed by these computational advances may render future progress intractable. In addition, finite prediction horizons and chaotic principles will often demand that solutions be amenable to updates once deployed and be able to adapt to unforeseen circumstances.

Accordingly, there exists a need for controllers able both to model and to manage systems manifesting complicated, nonlinear dynamics, as well as for systems able to create, monitor, and update such controllers. Such controllers would also, ideally, be amenable to quick and effective updates once deployed, rendering them adaptable to a variety of circumstances.

BRIEF DESCRIPTION OF THE DRAWINGS

Various of the embodiments introduced herein may be better understood by referring to the following Detailed Description in conjunction with the accompanying drawings, in which like reference numerals indicate identical or functionally similar elements:

FIG. 1A is a schematic diagram of an example linear oscillator system;

FIG. 1B is a schematic phase space diagram corresponding to the linear oscillator system of FIG. 1A;

FIG. 1C is a schematic phase space diagram corresponding to the linear oscillator system of FIG. 1A;

FIG. 1D is a schematic block diagram illustrating aspects of an example operational flow under Dynamic Mode Decomposition (DMD);

FIG. 1E is a schematic block diagram of an example inverted pendulum system;

FIG. 1F is a schematic phase space diagram corresponding to the inverted pendulum system of FIG. 1E;

FIG. 1G is a schematic block diagram illustrating aspects of an example operational flow under Koopman Operator composition;

FIG. 1H is a schematic neural network architecture diagram depicting an example autoencoder as may be used to determine observables in accordance with the Koopman Operator;

FIG. 1I is a schematic block diagram of an example physical system (a robotic arm) and its digital twin model counterpart;

FIG. 2A is schematic block diagram illustrating various example electromechanical digital controller systems with corresponding controller structures, as may occur in connection with some embodiments;

FIG. 2B is schematic block diagram illustrating various example resource dispatch and allocation digital controller systems with corresponding controller structures, as may occur in connection with some embodiments;

FIG. 2C is a schematic block diagram illustrating an example topology between a physical system, a digital control system, and a lifted predictive control system, as may be implemented in some embodiments;

FIG. 2D is a schematic block diagram illustrating an example topology between lifted predictive control commands and components of an example electromechanical digital controller system, as may be implemented in some embodiments;

FIG. 2E is a schematic block diagram illustrating an example topology between lifted predictive control commands and components of an example software network dispatch digital controller system, as may be implemented in some embodiments;

Figure 3A:
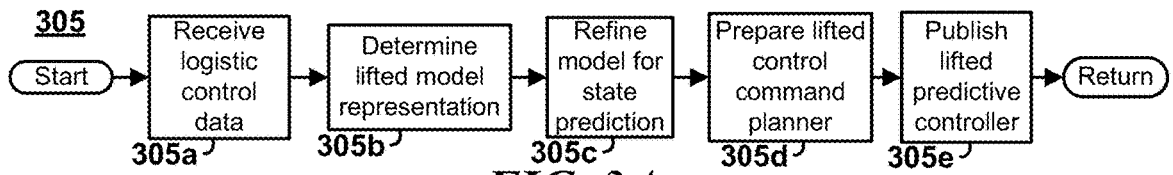
FIG. 3A is a schematic flow diagram illustrating various operations in an example process for creating a lifted predictive controller, as may be implemented in some embodiments.

The specific examples depicted in the drawings have been selected to facilitate understanding. Consequently, the disclosed embodiments should not be restricted to the specific details in the drawings or the corresponding disclosure. For example, the drawings may not be drawn to scale, the dimensions of some elements in the figures may have been adjusted to facilitate understanding, and the operations of the embodiments associated with the flow diagrams may encompass additional, alternative, or fewer operations than those depicted here. Thus, some components and/or operations may be separated into different blocks or combined into a single block in a manner other than as depicted. The embodiments are intended to cover all modifications, equivalents, and alternatives falling within the scope of the disclosed examples, rather than limit the embodiments to the particular examples described or depicted.

DETAILED DESCRIPTION

Overview—Lifted Representations

Characterizing physical systems in mathematical terms may facilitate many advantages, including improved predictive models, controls, better understanding of the physical system's behavior, etc. To accomplish such mathematical characterizations, one may identify measurable characteristics of the system, referred to as "observables," and a function describing the system's dynamics in terms of these observables, referred to as an "operator." Operators may include a single equation or a system of multiple equations.

For example, FIG. 1A depicts a linear oscillator physical system, having a weight 105c hung from a surface 105a via a spring 105b. The system may be characterized by the observable x, which indicates the distance of the weight 105c from the surface 105a at a given moment, the observable k, indicating the spring constant of the spring 105b, and the observable m, representing the mass of the weight 105c. With these observables, one may construct an additional observable H (the Hamiltonian) as shown in EQN 1:

$$H\left(x(t), \frac{d(x(t))}{dt}\right) = \frac{m}{2}\left(\frac{d(x(t))}{dt}\right)^2 + \frac{k}{2}(x(t))^2 \quad (1)$$

More specifically, characterizations of physical systems by operators upon their observables which satisfy both additivity and homogeneity properties are referred to as "linear" systems.

Following characterization of a system, one may plot the system's temporal evolution in terms of the observables, referred to as a phase space diagram (here, one will appreciate that all possible states of a system may, or may not, be depicted in such a space for an observable selection). For example, FIG. 1B is a schematic phase space diagram 110c corresponding to the harmonic oscillator system of FIG. 1A, wherein each point in the space of plotted observables x, k, and m, refers to a state of the system having those observable values. The evolution of the system in time may be represented by a succession of points along a trajectory in the phase space. Here, as k and m are fixed values, the trajectory 110*d* of the system in this diagram may be rather uninteresting, as the observable x will simply oscillate between extremal values corresponding to the points 110*a* and 110*b* in the state space 110*c*.

Naturally, a different choice of observables will produce different representations of the system. For example, in the schematic phase space diagram 110*e* of FIG. 1C, the observable m has been replaced with the observable "the velocity of x", i.e., the term $\dot{x}$. Here, the system's temporal evolution will occur upon an elliptic trajectory 110*g*. For example, the point 110*f* may correspond to the mass's crossing the midpoint of its oscillation when the velocity is maximally positive, while at the point 110*h*, the velocity may be zero once the mass reaches its extremal position. Note that the velocity observable $\dot{x}$ did not appear in FIG. 1. Accordingly, one will appreciate that not all observables may appear in the operator representation of a physical system.

Often, one does not know the exact values or relations between observables characterizing a physical system. For example, one may not know the values of the mass m and the spring constant k in the system of FIG. 1A, or the linear relationship between the observables. Fortunately, by observing snapshots of the observable values over time, one may infer such characteristic properties of the system using various computational methods. For example, Dynamic Mode Decomposition (DMD), shown schematically in FIG. 1D, is one numerical method for inferring system properties from a dataset of temporal observations. Specifically, after having captured T+1 snapshots of observable data, a practitioner may organize the data into the data matrices D 115*a* and D' 115*b*, respectively, as shown in FIG. 1D. That is, with reference to the matrix D 115*a*, $X_1$ represents a vector of observable values at a first instant in time, $X_2$ represents a vector of the same observables' values, but as those values appear at a second, successive, instant in time, and so forth, until the time T. The vector $X_1$ may thus have values corresponding to, e.g., the observables position, velocity, and acceleration of the harmonic oscillator at a given instant in time. As indicated, each column of D' 115*b* corresponds to the temporally successive snapshot to the corresponding column of D 115*a* (i.e., the first column of D 115*a* is the snapshot at time 1, whereas the first column of D' 115*b* is the snapshot at time 2).

A is a matrix representation of a linear function characterizing the temporal evaluation of the system generating the data of D 115*a* and D' 115*b*. By organizing 115*c* these matrices appropriately, A's values may be numerically inferred using the appropriate matrix operations. That is, assuming that A will reflect the evolution of the system in a single time step, then $$AD=D' \quad (2)$$

By rearranging terms 115*d*, one can move D from the left to the right side (the dagger † here indicating D's pseudo-inverse).

$$A=D'D^\dagger \quad (3)$$

Having estimated A by the multiplication of these matrices, we may now use 115*e* A to estimate a future state $S_{t+1}$ of the system given the system's current state $S_t$ at time "t":

$$AS_t=S_{t+1} \quad (4)$$

One will appreciate that this basic principle underlying DMD has been extended with a variety of numerical improvements (e.g., as described in "Extended Dynamic Mode Decomposition with Dictionary Learning: A Data-Driven Adaptive Spectral Decomposition of the Koopman Operator" arXiv preprint arXiv: 1707.00225 (2017) by Qianxiao Li, Felix Dietrich, Erik M. Bollt, Ioannis G. Kevrekidis). Similarly, one will appreciate the existence of other numerical methods, which may be applied to determine system dynamics from a temporal collection of observable snapshots.

Unfortunately, many approaches, such as DMD described above, are only able to characterize linear relationships between the observables. As not all physical systems readily lend themselves to linear operator characterizations, i.e., by observable and operator selections satisfying both the additivity and homogeneity properties, DMD and related algorithms may perform poorly upon systems characterized in this form. These characterizations which do not satisfy both additivity and homogeneity (though they may satisfy only one of these conditions) are referred to as being "nonlinear." By far the majority of physical systems encountered in the universe will recommend themselves to such nonlinear characterizations when first encountered.

For example, FIG. 1E is a schematic block diagram of an example inverted pendulum physical system 120, where an inverted mass 120*b*, of mass m, is attached to a cart 120*a*, of mass M, by a rod of length l, and subjected to a force F 120*e*. By careful application of the force 120*e*, the system can be made to maintain the mass 120*b* about some angle 120*c* relative to the vertical axis 120*d* (e.g., to balance the mass 120*b* above the cart 120*a*). As in the system of FIG. 1A, we can likewise plot observable values in a phase space for the system of FIG. 1E, e.g., in the schematic phase 125*a* space shown in FIG. 1F, where the dimensions are the temporal derivatives of the position X and angle θ (i.e., $\dot{X}$ and $\dot{\theta}$), and the angle θ itself (naturally, one will appreciate that the trajectory 125*d* between states 125*b* and 125*c* in the representation 125*a* is schematic, shown merely to facilitate the reader's comprehension, and may not correspond to a physically possible path in an actual inverted pendulum). A more complete phase space characterization may include additional dimensions reflecting other free observables, e.g., the force 120*e* applied to the cart.

While the inverted pendulum of FIG. 1E may be readily characterized by the following system of equations using the available observables:

$$F=(M+m)\ddot{x}+ml\ddot{\theta}\cos\theta-ml\dot{\theta}^2\sin\theta,$$

$$0=ml\ddot{x}\cos\theta+(l+ml^2)\ddot{\theta}-mgl\sin\theta \quad (5)$$

where l is the moment of inertia, this characterization does not satisfy both of the requirements of homogeneity and additivity, and consequently, is nonlinear. Because it is nonlinear, linear prediction methods, such as DMD, do not generally infer accurate representations of the system from snapshots of its dynamics data. While dynamics of the inverted pendulum may be inferred analytically, most non-linear systems are too complicated for direct analysis and inferring their dynamics with a numerical approach may instead be often greatly preferred. Indeed, many applications require time-sensitive updates and responses, making a timely analytic assessment unfeasible.

Fortunately, while an original selection of observables, e.g., position and velocity, may present a system's evolution operator in a nonlinear form, one may instead define a space of observables (functions whose domain is the original observable space), then observe the dynamics' evolution in this space to infer a choice of observables accommodating a linear operator representation. These new functions' evolution is defined by operators induced by the underlying nonlinear evolution operator. Such a viewpoint is referred to as an operator-theoretic approach, examples of which include the Koopman (or composition) Operator, or its adjoint, the Perron-Frobenius Operator. These operators are, by their definitions, linear operators and will consequently facilitate a linear characterization of the system. By selecting functions from the new observable space and applying them to states in the original space, one may acquire a new representation of the system referred to herein as the "lifted" representation of the system. That is, one may, e.g., define a set of observables on the original phase space and track these observables' evolution over time, as evolved by the Koopman operator, rather than the original phase space trajectories.

Merely to facilitate the reader's comprehension, and with specific example reference to the Koopman Operator, FIG. 1G is a schematic block diagram illustrating aspects of an operational flow under Koopman Operator composition. Specifically, given a nonlinear characterization of a physical system, corresponding to a first set of observables 130a and related observable space 130d, the Koopman Operator 130b may be used to update the set of observables 130c associated with a representation of the system's evolution in a linear (or in some numerical situations, a near-linear) form. Again, the new choice of observables (e.g., the set 130c) is referred to herein as the "lifted representation" of the physical system. Mathematically, the Koopman operator K is an infinite-dimensional linear operator that acts upon the observables g. Thus, in the discrete case, if the state x of the system at a time t evolves per the nonlinear evolution operator f $$x(t+1)=f(x(t)) \quad (6)$$

and the observables g (also referred to as a "measurement function") produce output values v for a give state of the physical system at a particular time $$v(t)=g(x(t)) \quad (7)$$

then the Koopman operator K may be defined as $$Kg(x) \triangleq g \cdot f(x) \quad (8)$$

where · is the composition operator. Thus, an observable state g(x(t)) in the new lifted space representation may have a corresponding future observable state g·f(x(t)) in the lifted space representation of the new, lifted observable selection 130e.

While, in practice, one may find the lifted presentation analytically, often it is more economical to employ a computational system for this purpose. As just one example, to facilitate the reader's comprehension, FIG. 1H depicts a schematic representation of a neural network autoencoder architecture as may be used to determine lifted observables in accordance with the Koopman Operator. Specifically, at each cycle of training, the autoencoder may be presented at its input with the observable values for the system 135a at a given instant of time. These values may traverse hidden layers in an encoder portion 135b, to produce values for the observable dictionary layer 135c. The values may continue through hidden layers in the decoder portion 135d, where they are compared with an output 135e. Output 135e may be the same as the input 135a and the training loss may be a function of both the difference between output 135e and input 135a as well as the predictive power of the currently selected observable combination at observable dictionary layer 135c. One will appreciate variations, e.g., where output 135e is instead to be the time evolved predicted value of the observables following the time corresponding to input 135a. That is, vector 135e will instead have time-advanced values (e.g., state system observable values at time t+1 as compared to the values at time t in vector 135a) from the snapshot training data. In such implementations, the loss may include the difference between a correct t+1 prediction expected at the output 135e and the actual values produced at the output 135e.

In other words, training may force a network to both identify an alternative representation of the observables in the observable dictionary layer 135c and to ensure that that choice facilitates correct prediction of the system dynamics via a linear characterization. Accordingly, one may construe encoder portion 135b as the Koopman Operator eigenfunctions and decoder portion 135d as the inverse of the eigenfunctions. One will appreciate that the autoencoder approach shown here is one example, and other approaches to identifying alternative observable representation with predictive power in a linear characterization are readily available.

The ability to represent complicated dynamics with a linear characterization provides a number of advantages, particularly, the ability to model and predict the system's behavior more efficiently (e.g., exponentiation of a matrix describing the linear dynamics is often computationally tractable, facilitating considerable extensions of the prediction horizon as compared to a nonlinear representation). Such modeling and prediction may facilitate controls implementations to manage the original physical system or to simulate that system's behavior under given conditions (and, naturally, both modeling and controls). For example, FIG. 1I is a schematic block diagram of a "digital twin" model, as may occur in some embodiments. Here, a physical robotic system 140a may exhibit complicated dynamics, which, via a lifted representation become amenable to a linear characterization. Once so characterized, a digital simulation 140b may serve as a "twin" of the original system 140a. With the digital twin 140b, a user may now simulate the behavior of the original system 140a, simulate the application of controls to the original system 140a, predict a future state of the original system 140a by quickly evolving the state of simulated state of the digital twin 140b, speculate upon design adjustments and witness such adjustments' effects under simulation without actually modifying the physical robotic system 140a, etc. Thus, digital twins may serve as models for all, or a portion, of a physical system, thereby facilitating numerical prediction and assessment. One will appreciate that multiple such digital twin models may likewise be interfaced with one another in imitation of the relationships (physical, digital, causal, etc.) they exhibit between one another in physical reality. Thus, a "general" digital twin model may itself comprise may "local" subunit digital twin models.

Overview—Digital Controller Systems

Various of the disclosed embodiments facilitate improved control of existing digital controller systems. Generally, these existing control systems addressed by the disclosed embodiments may be grouped into one of two classes: electromechanical digital controller systems 205a, e.g., as shown in FIG. 2A; and resource dispatch and allocation digital control systems 210a, e.g., as shown in FIG. 2B. Accordingly, one will appreciate that "digital controller system" is used herein to refer simply to a physical system coupled with at least one digital controller, whether in the electromechanical digital controller class or in the resource dispatch and allocation class.

Electromechanical digital controller systems 205a are mechanical systems wherein digital controllers are employed to monitor and control electrical and mechanical system dynamics. Accordingly, many robotics systems, vehicles, construction hardware, etc. are electromechanical digital controller systems. Typically, the digital controllers of the systems 205a do not employ a lifted representation (though, as discussed herein, updates may be applied to lifted representations once present). In example vehicle system 205b, a variety of Electronic Control Units (ECU) serve as digital controllers to monitor and control various aspects of the vehicle's dynamics, such as the vehicle's fuel consumption, engine health, acceleration, braking, etc. Similarly, in the example aircraft 205c a number of digital controllers may monitor and control power, autopilot operations, fly-by-wire operations, etc. Thus, each electromechanical digital controller system may comprise a collection 205f of digital controllers, 205g, 205h, 205i, such as ECUs, autopilot feedback systems, power controls, etc. Alone or in combination, the controllers 205g, 205h, 205i may receive 205d sensor inputs assessing the physical system's dynamics and provide corresponding electromechanical commands 205e in an attempt to achieve a desired behavior in the physical system (e.g., based upon the controller's internal predictions of the system's behavior). For example, one will appreciate that many ECU systems may communicate with various electromechanical components (and with one another) via Control Area Network (CAN) messages, JavaScript Object Notation (JSON) data messages, Serial Peripheral Interface (SPI) messages, General Purpose Input/ Output (GPIO) messages, etc. (naturally, controllers other than ECUs may likewise use these data formats).

Thus, as shown in the exploded view 205j of digital controller 205g, a digital controller may include an actuator system 205k for providing control commands 205e, a sensor system 205l, for receiving data regarding the state of the dynamics 205d (e.g., in the format of one of the above messages), and an internal model 205m of the physical system dynamics, which may be used for prediction and control. One will appreciate that the digital controller's model may not be isolated and specifically defined as such within its design. For example, a feedback digital controller system may include a Kalman Filter, which includes an internal model 205m in its estimated states and update procedure for the physical system, though it may not be explicitly identified as a "model" by the controller's designer.

While resource dispatch and allocation digital control systems 210a may share a topological structure similar to that of electromechanical digital controller systems 205b, these systems' interaction with the physical dynamics are primarily via telecommunication systems rather than via electromechanical systems. For example, in the hospital dispatch system 210b, a central dispatch computer server 210d may be in communication with a variety of local computer systems, e.g., at multiple hospitals, upon user personal cell phone devices, within ambulance on-vehicle computer systems, etc. The hospital dispatch system 210b may, e.g., employ a control algorithm for a network of medical treatment facilities, where the control algorithm controls the transfer of patients, consumable supplies, or non-consumable equipment between medical treatment facilities in order to optimize one or more objective metrics, e.g., minimizing the total number of patient deaths, minimizing patient wait times until treatment, etc. Similarly, a local shipping dispatch computer system 210e at a port 210c may be in network communication with server systems tracking incoming ships, the number and nature of goods onboard, available cranes and transport vehicles, etc. Where such servers model their respective physical systems they likewise constitute digital controllers (e.g., as when a server system maintains a linear programming protocol for allocating container types, or patient infirmities, as they arrive). Thus, shipping dispatch computer server system 210e may implement a control algorithm for coordinating the arrival, unloading, loading, and/or departure of cargo ships in a port. In lieu of direct communication with electromechanical actuators, server system 210e may instead, e.g., provide directives to port operators (e.g., via handheld devices), direct local automated systems (e.g., refrigeration systems), communicate with vendor service systems (e.g., freight transporters), etc. One will appreciate additional similar systems beyond these examples, such as servers implementing control algorithms for managing the supply chain of businesses in the roles of suppliers, manufacturers, and/or retailers.

Thus, like the collection 205f of controllers 205g, 205h, 205i appearing in the electromechanical digital controller system 205a, the resource dispatch and allocation digital controller systems 210a may employ a collection 210h of one or more digital controller systems 210j, 210k, 210l, which likewise both monitor 210f and act upon 210g the system. However, unlike the controllers of the collection 205f, the controllers of collection 210h, as shown in the exploded view 210i of controller 210j, may possess different internal components. These controllers' control system may likewise include software, firmware, or hardware configured to produce outputs for interaction with the physical system, but here via network command outputs 210m, e.g., via a network interface. Similarly, in lieu of a sensor system 205l, the controller 210j may have a state parameter input 210n. For example, dispatch server 210d may receive telephone calls from injured users, global position system (GPS) location updates for ambulances, etc. Similarly, the model 210o, may be more programmatic and rules/conditioned-based than the model 205m. For example, local shipping dispatch system 210e and dispatch server 210d may employ routing algorithms, linear programming, applications from mathematical transportation theory (e.g., as formalized by Gaspard Monge), etc. As the differences serve generally similar input and output functions, one will appreciate that the digital controllers in systems 205a and 210a need not be categorically distinct, but rather, exist along a continuum from modeling and control of physical dynamic systems and modeling and control of representations of networked resources which interact indirectly with physical agents.

As previously discussed, many existing modeling and control systems have difficulty maintaining complicated, nonlinear representations of physical systems in both classes of systems 205a and 210a. Despite the interaction with the physical components via controllers 205f and via controllers 210h, unpredicted dynamics may precipitate chaotic behaviors ill-suited for management by systems operating with nonlinear dynamics. Similarly, the sometimes conditional and discontinuous character of systems 205a and 210a can limit the ability for many naive linear control models to effectively anticipate system behaviors and to respond accordingly.

Various of the disclosed embodiments address these problems by designing and applying one or more "lifted predictive controllers." Such a controller may include a digital twin model of the one or more digital controllers which it is to monitor (though some lifted predictive controllers may model the physical system dynamics as well). Specifically, as shown in FIG. 2C, digital controllers 215b (e.g., one or more of controllers 205g, 205h, 205i or of controllers 210j, 210k, 210l) may receive 215f state data and provide control responses 215g back to a physical system 215c (e.g., directly via an actuator, as in systems 205a, or indirectly via communication channels, as in systems 210a). Once created, the one or more lifted predictive controllers 215a may provide 215e commands to digital controllers 215b or receive 215d data from the controllers 215d. In some embodiments, the one or more lifted predictive controllers 215a may also, or alternatively, interact directly with the physical system, via independent actuators or network commands 215h and may similarly receive physical state data 215i via sensors or via communication systems. However, operating upon the existing controllers 215b by providing 215e commands as shown in the example of FIG. 2C, may simplify deployment in some situations.

For example, as shown in FIG. 2D, in the systems 205a the commands 215e may take the form of predictive control commands 220a applied 220d to activate a digital controller's actuator system 205k, e.g., via a separate connection to the actuator's control input. Similarly, predictive state commands 220b may be applied 220e to sensor system 205l, e.g., via a separate connection to the sensor input. Finally, lifted predictive model commands 220c may be applied 220f to the system's model 205m, e.g., via access to the controller's memory (e.g., the predicted state of a Kalman filter may be replaced with that determined by the lifted predictive controller 215a).

Similarly, as shown in FIG. 2E, the created lifted predicted controls provided 215e as commands may likewise operate upon the digital controllers of systems 210a (e.g., the controller 210j). Here the predictive control commands may be used to adjust commands outputted 210m from the controller (e.g., a network software interface may be augmented to shunt or replace 225d commands from the digital controller with those from the lifted predictive controller 215a at the command of the lifted predictive controller 215a). Similarly, the parameter inputs 210n received by the digital controller may be augmented 225e (e.g., as a replacement or additional input) with state commands 225b from the lifted predictive controller. Finally, the lifted predictive controller may augment or replace 225f the digital controller's model 210o with results 225c from the lifted system. For example, where the digital controller was using a rule set for control, a substitute rule set may be provided, or conditional statements for the control modified (as, e.g., when the lifted predictive controller 215a adjusts thresholds for performing various actions).

Example Lifted Predictive Controller Management System (LPCMS)

To create the lifted predictive controllers described in the previous section, various embodiments contemplate the application of a Lifted Predictive Controller Management System (LPCMS), an implementation in software, firmware, or hardware, of the various steps in lifted predictive controller creation, and in some embodiments, logic for monitoring and updating the deployed lifted controllers. FIG. 3A is schematic flow diagram illustrating various operations, at a general level, of the LPCMS' process 305 for creating a lifted predictive controller, as may be implemented in some embodiments. Specifically, the LPCMS may first receive the digital controller data (and possibly physical system data) at block 305a. This data may be in the form of a collection of data snapshots of the digital controller's model states, sensor inputs, and command outputs over time (e.g., temporal snapshot data from controller 215b and related sensors). In some embodiments, the data may also include information from the physical system (e.g., data from additional sensors, unaffiliated with a specific digital controller). As mentioned, while this data may be organized in a temporally sequential order, that may not be necessary for some methods of determining lifted representations.

At block 305b the LPCMS may determine a lifted model representation of the dynamics reflected in the data received at block 305a. This may be accomplished using, e.g., DMD, EDMD, Koopman Mode Decomposition (KMD), and other methods disclosed herein. These decomposition processes may determine the dominant dynamics of the digital process in the digital controllers. These dynamics may then be used to predict the future state of the digital controller and the digital system after application of a control signal. To this end, at block 305c, this model may be refined to better ensure appropriate state prediction (e.g., by cross-validating predicted states of the lifted representation with additional available temporal data from the digital controller system). As disclosed herein, refinement may also include adjusting the selection of parameters to be used in selecting or configuring a lifted representation for more robust results.

At block 305d, the LPCMS may prepare a command control planner to implement the desired states for a digital system or digital controller using the lifted model (e.g., to ensure ongoing maximization of a preferred metric). For example, with the lifted model, it may be possible to predict the digital control systems' behavior much farther in to the future than would be possible with a non-lifted model. Using these more advanced predictions, with a more distant prediction horizon, the LPCMS may prepare a more robust control system. Once properly prepared, the LPCMS may indicate that the one or more models and controllers are ready for deployment at block 305e. In some embodiments, the LPCMS may deploy the controllers itself, e.g., as software updates pushed out to the various digital control systems, deploying the lifted models to a virtual simulation environment, deployment to a local or cloud server, etc. Indeed, some embodiments may directly load the digital twin model(s) into a virtual simulation environment. In other embodiments, the publication and deployment at block 305e may instead be an indication of the adjustments to be implemented by a human engineer. Naturally, physical systems operating in controlled environments may also serve as "virtual models" in some situations for their "in the wild" counterparts operating in live, uncontrolled environments.

For clarity, deployment to a virtual simulation environment may occur where the digital control system 215b is associated with a virtual rather than a physical system. For example, in embodiments directed to, e.g., ECUs in a car engine, a virtual simulation may emulate the systems-level behavior of the car engine, such as Control Area Network (CAN) bus messaging, radar depth values, etc. Deployment to such a synthetic, controlled environment may be useful, e.g., during the design process, to allow a designer to assess the character and quality of a design choice (e.g., having prepared a model and controller using the LPCMS for a first newly introduced component into the design, the designer may now proceed to consider the addition and behavior of a second component, thus simulating the combined effect of the new components).

Figure 3B:
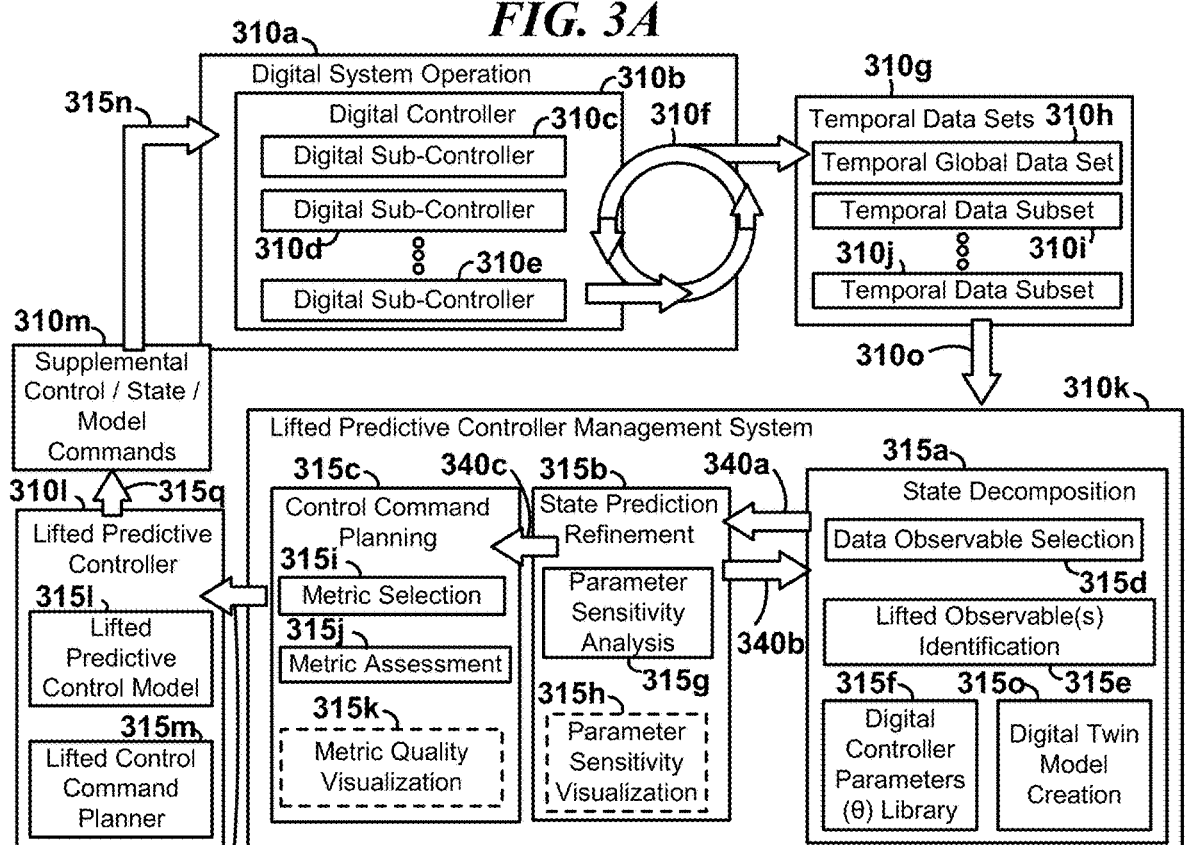
FIG. 3B is schematic block diagram illustrating the operation of a Lifted Predictive Controller Management System (LPCMS), as may be implemented in some embodiments.

To facilitate the reader's comprehension of the general operations disclosed in the process 305 in greater detail, FIG. 3B is schematic block diagram illustrating an example implementation and operation of a LPCMS. Here, during an initial period, the digital controller system 310a (e.g., operating on one of the physical systems 205a, 210a or upon a virtual simulation of a system) may include one or more controllers 310b, which may themselves include one or more digital controllers 310c, 310d, and 310e. As time passes, the physical system and its interaction with the digital controllers 310c, 310d, and 310e may evolve 310f. Snapshots of observable values at time instants in this evolution may be collected and organized, e.g., via the existing recording software or hardware of the digital controllers, a recording attachment, etc. These snapshots may be organized as datasets 310g. For example, the digital controller 310b may be associated with a global data set 310h, the sub controller 310c may produce the dataset 310i, sub controller 310e, may produce dataset 310j, etc.

Figure 3C:
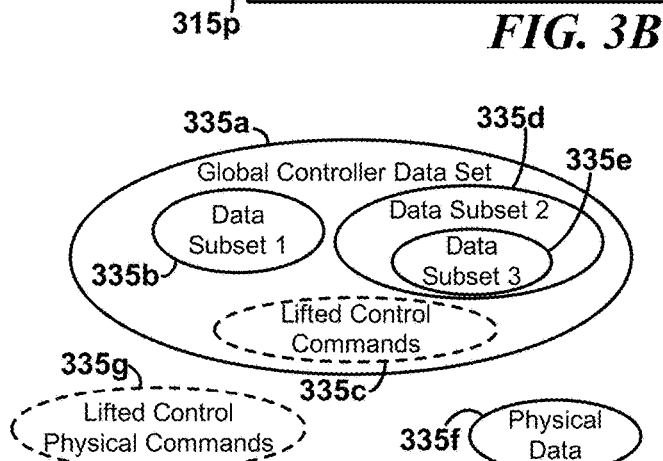
FIG. 3C is schematic Euler diagram illustrating various example data set hierarchies, as may occur in connection with some embodiments.
Figure 6A:
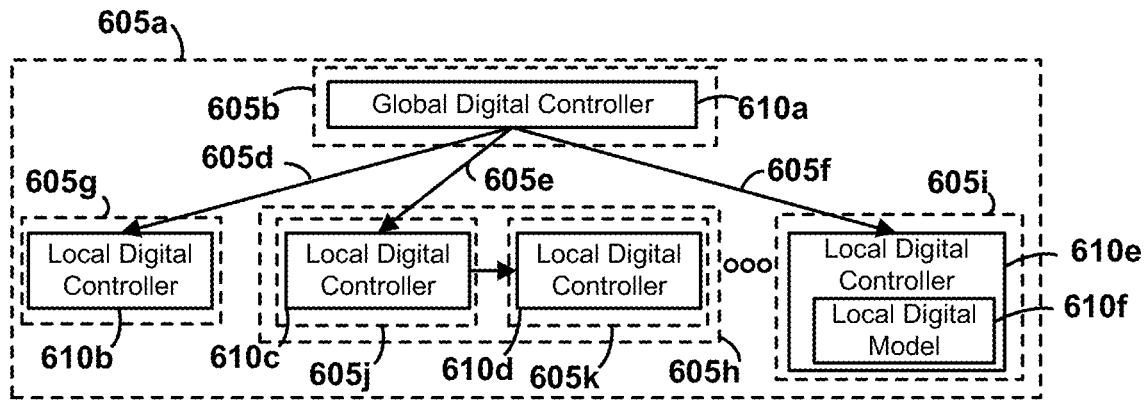
FIG. 6A is schematic block diagram illustrating an example digital controller topology and corresponding lifted digital twin models, as may occur in some embodiments.

The possibly hierarchical and interrelated nature of these datasets (which may mirror the corresponding topology of the digital controllers) is discussed further herein with reference to FIG. 6A. Briefly, however, FIG. 3C is schematic Euler diagram illustrating various data set hierarchies, as may occur in relation to some embodiments. For example the entirety 335a of the data from the digital controllers may include datasets from controllers only (e.g., dataset 335b) as well as datasets from controllers with sub controllers producing their own datasets (e.g., dataset 335d with corresponding data subset 335e). As mentioned, sensors monitoring the physical system may also provide datasets 335f (though indicated as "physical data", one will appreciate that the data may be virtual simulations of physical data in some embodiments). Where the different datasets are acquired at different frequencies or granularities, interpolation may, e.g., be applied to harmonize to a common granularity (naturally, one will appreciate alternatives and variations, such as down-sampling of the snapshot data). Similarly, one will appreciate that the datasets may be reformatted to a common form for processing by the LPCMS.

In some embodiments, during subsequent iterations of the LPCMS' creation of lifted predictive controllers, the temporal datasets 310g may also include the commands 335c to the digital controllers and to the commands to the physical system 335g from previously deployed lifted predictive controllers. In this manner, in some embodiments the LPCMS system may anticipate and accommodate the presence of previous deployments.

The LPCMS 310k may receive 310o the data sets 310g (e.g., by querying another process to obtain the controller data and then organizing the data into snapshots, querying the controllers for their current data periodically over time so as to form data sets 310g, etc.). As shown here, LPCMS 310k generally comprises three components, which may themselves be software, hardware, firmware or a combination thereof: a state decomposition component 315a, a state prediction refinement component 315b, and a control command planning component 315c.

State decomposition component 315a may itself include components (software, hardware, or firmware) dedicated to selecting observables 315d and performing lifted observable identification 315e. For example, component 315d may reformat the temporal data 310g into a set of observables, which can be used to infer a lifted observable representation at component 315e, e.g., with the assistance of one or more neural networks as disclosed herein. The state decomposition component 315a may also be provided with, infer, or maintain a library of the digital controller parameters (e.g., the types and number of inputs and outputs available to the digital controllers in the system). A digital twin model creation component 315o may be used to model specific digital controllers, as described in greater detail herein with respect to FIGS. 6A and 6B, prior to determination of a model for the entire digital controller system (though shown here as separate components for clarity, one will appreciate that in some embodiments the operations of components 315e and 315o may overlap, e.g., where lifted observables are determined for a lifted digital twin model).

The state prediction refinement component 315b may likewise include software, firmware, or hardware directed to performing a parameter sensitivity analysis 315g as disclosed herein. This analysis may facilitate refinement of the lifted observable selection and representations to improve prediction accuracy and efficiency. In some embodiments, a visualization system 315h may also be provide so that a user can monitor the LPCMS' operations.

The control command planning component 315c may include firmware, hardware, or software directed to metric selection 315i and metric assessment 315j for use in creating the controls software of the lifted predictive controller. That is, the one or more metrics chosen, or applied, in metric selection 315i will be used to determine the nature of the controls to be imposed using the lifted model to achieve a desired objective. For example, in the hospital resource allocation context, the metric may be a scoring function assigning penalties for patient treatment wait times, weighted by the severity of the patient's ailment. Similarly, in the vehicle ECU context, penalties may be imposed for fuel consumption, operation outside safety tolerances, etc. In some embodiments, only a single metric may be specified, and so metric selection component 315i is directed to only that single metric. In some embodiments, a metric quality visualization component 315k may be included so that a user can review the quality of the lifted predictive controller's performance. For example, in certain critical situations, such as vehicle control, healthcare management, etc., it may be important that the safety and efficacy of the lifted predictive controller be thoroughly evaluated and confirmed before deployment. Again, in some embodiments, designers may first apply the LPCMS to a virtual simulation of the physical system, confirm viability, and then apply the LPCMS to corresponding datasets acquired from the actual system. Where the lifted predictive controller's performance is not yet adequate, the user may direct the LPCMS to again selected a lifted representation or to adjust the controls objective metric, this time under modified conditions responsive to the deficient performance.

One will appreciate that controls may be accomplished using the lifted model by, e.g., predicting the future state of the digital system, or predicting the current state of the digital system, or performing a mathematical decomposition process on the past history and current state of the digital process, etc. The mathematical decomposition process may produce quantities that characterize the time-dependence of an input to the decomposition process. For example, when acquiring models for an ECU controller in a vehicle, the system may estimate a timing model from the ECU signals in accordance with event based simulations.

Once the LPCMS determines one or more effective lifted predictive controllers optimized to the one or more metrics selected at block 315i (one will appreciate that "selection" may include, e.g., iterating among a corpus of metrics until one produces the best results, or working through a corpus of metrics provided by a designer until performance exceeds a threshold, or applying a single, pre-established metric), the one or more lifted predictive controllers may be published for deployment 315p (e.g., deployed as a software update over the network, provided to an engineer for installation, etc.). Generally, each lifted predictive controller may include a lifted model 315l, either of the digital controller system as a whole, or of the portions to which a particular lifted predictive controller is directed, and a lifted controller command planner 315m, comprising the determined control logic of the lifted predictive controller, which will determine and generate 315q the command outputs 310m (e.g., commands 220a, 220b, 220c or 225a, 225b, 225c, or commands to other actuators, sensors, and resources in the digital system) to be applied 315n to the digital controllers or physical system based upon the predicted state of the model 315l. One will appreciate that, in some embodiments, the lifted predictive control model 315l may itself continue to receive real-time state data from the digital controller system or physical system, validating its representation, albeit lifted, of the ongoing dynamics. One will also appreciate, as discussed above with reference to FIGS. 2D and 2E, that some embodiments may require that outputs of the lifted model be converted to an original data format so that they may be applied to a digital controller in its native form. For example, as automobile ECUs may communicate over a CAN bus, the system may convert outputs from the lifted controllers into the CAN message format (or other format as the case may be) so that they may be applied by the native controllers or take the place of the native controllers in the digital system.

Figure 3D:
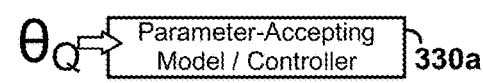
FIG. 3D is schematic block diagram of a parameter-accepting model/controller, as may be implemented in some embodiments.
Figure 3E:
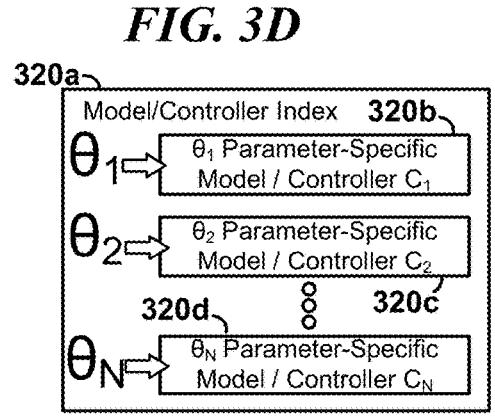
FIG. 3E is schematic block diagram of a parameter set-to-model/controller index, as may be implemented in some embodiments.

Depending upon the circumstances, the nature of the models 315l and control logic 315m may take a different form within the lifted predictive controller 310l. Specifically, in some digital controller systems the parameters in the library 315f may remain relatively fixed, whereas in other digital controller systems they may vary considerably. Consider, e.g., a regenerative braking management system in a vehicle, where the value parameters may be dynamic, but the number and quantity of parameters themselves are unlikely to change (e.g., the number of tires and breaks are constant over time). Conversely, consider a healthcare system with only a small number of hospital services active for most of a month, but with all its services operating to full capacity during holiday periods, the services providing radically different structures and character of care in these more intensive periods than in the slower periods.

Where the parameter variation is of a sufficiently predictable nature (e.g., as in the braking system), the parameters may be incorporated as inputs into the models and controls as another input, as shown in FIG. 3D. However, in some situations, it may be more effective to instead create distinct models and controllers for the distinct parameter situations (e.g., the disparate behavior of the hospital system when different services are online), e.g., as shown in FIG. 3E. In these latter situations, some embodiments create a parameter based index 320a. Given a collection of parameter values, e.g., one of the parameter collections $\theta_1, \theta_2, \theta_N$, the index may return one of the corresponding model-control logic pairs 320b, 320c, and 320d. In some embodiments, the index may include meta-data for the domain upon which the digital twin models were trained (e.g., so that the deployed lifted predictive controller may select the appropriate model and control logic in the appropriate circumstance). While, in theory, the LPCMS could be applied to always produce models of the form in FIG. 3D, in practice, employing an indexed system of FIG. 3E, particularly for the varied examples circumstances of the healthcare system, may allow more customized, and consequently more effective, models and controllers to be created. In some embodiments, a designer may specify a distance metric upon the parameters to facilitate selection and interpolation between parameter sets (e.g., a Euclidean distance as discussed herein). In addition, as the LPCMS considers data 310g and encounters datasets with disparate parameters in accordance with the distance metric, the LPCMS may designate the data to be associated with creation of a separate, indexed model and controller in accordance with those parameters as shown in FIG. 3E.

Example Lifted Representation Determination Methods

Figure 4A:
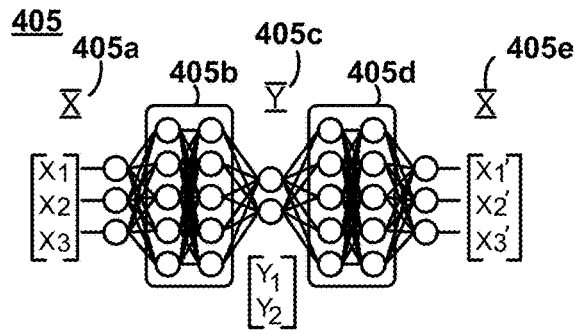
FIG. 4A is a schematic architecture diagram for an example autoencoder neural network as may be used to determine the lifted representation of digital system training epoch data in some embodiments.
Figure 4B:
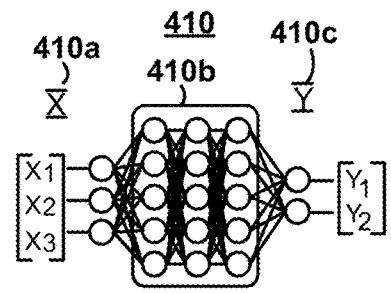
FIG. 4B is a schematic architecture diagram for an example neural network to determine the lifted representation of digital system training epoch data, as may be implemented in some embodiments.

State decomposition component 315a may employ a variety of techniques to determine the lifted representation of the digital controller system. In automated implementations, neural networks may be used for recognizing an appropriate selection of lifted representation observables (e.g., via identification of the Koopman eigenfunctions). For example, FIG. 4A is a schematic architecture diagram for an example autoencoder neural network and FIG. 4B is a schematic architecture diagram for an example neural network, each of which may be used to identify a lifted representation. In the architecture 405 (similar to that of FIG. 1H), data from the digital controller system may be presented at an input 405a, fed through a first set of hidden layers 405b, intermediate hidden layers 405c, and a final set of hidden layers 405d before producing an output 405e. The loss may be assessed using a function comprising a difference between the output 405d and the input 405a and/or a difference between the predictive ability of the presently selected observables in the hidden layers 405d as compared to, e.g., a validation portion of the training data. Trained properly, the intermediate representation in the layers 405c may be used as a "dictionary" from which to select those combinations of observables most suitable for producing a lifted representation.

Similarly, architecture 410 may receive digital controller system data at input layers 410a, pass the results through hidden layers 410b, and arrive at output 410c to produce a selection of observables from a dictionary. Specifically, in the implementation 410 the dictionary of observables and the matrix representation of the Koopman operator may be learned "simultaneously" (that is, training the network may produce both the dictionary and the matrix representation of the operator). For example, during training, inputs at time t may be presented at input layers 410a and passed through hidden layers 410b to produce the dictionary 410c at time t. The current form of the Koopman operator matrix may then be applied to these dictionary values at time t to predict the dictionary values at time t+1. The loss function may then be taken as the difference between the predicted dictionary values and the dictionary values produced when actual data from the time t+1 is passed through the network. One will appreciate that various regularization terms may be introduced into the loss function to promote sparsity or other desired characteristics in the lifted representation.

Figure 4C:
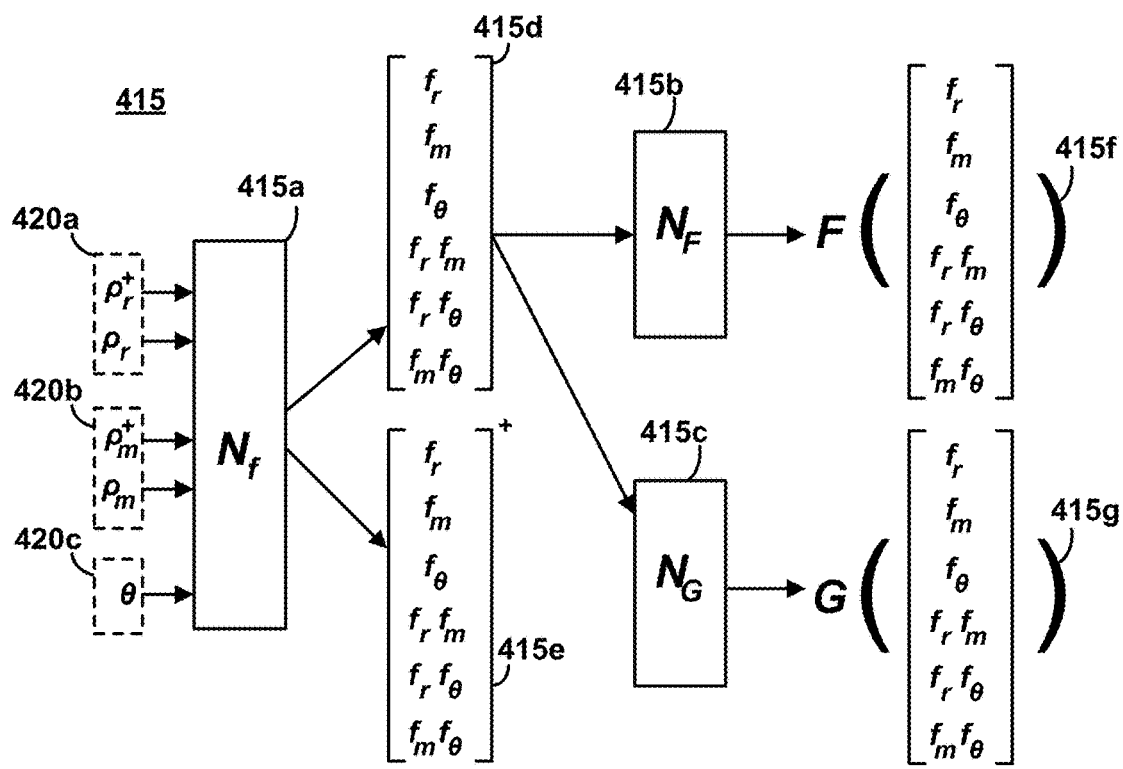
FIG. 4C is a schematic block architecture diagram depicting components in an example ensemble neural network for determining a lifted representation of digital system training epoch data, as may be implemented in some embodiments.

FIG. 4C depicts another example architecture 415 for determining a lifted representation from system data as may be used by the state decomposition component 315a. In this example, a feed-forward neural network $N_f$ 415a and feed-forward neural network $N_F$ 415b may be used to represent the observables f and Koopman mapping F, respectively. A third neural network $N_G$ 415c may be used to learn a mapping from the space of observables to the outputs used by an optimizer to compute the cost function (e.g., using an Adam optimizer as described in "Adam: A method for stochastic optimization." arXiv preprint arXiv: 1412.6980 (2014) by Diederik P. Kingma and Jimmy Ba). This mapping may then be used in computing a cost function in parallel with the operation of networks $N_f$ 415a and network $N_F$ 415b. Thus, the three neural networks $N_f$ 415a, $N_F$ 415b, and $N_G$ 415c may be trained simultaneously, using, as an example, the corresponding loss function L as shown in EQN. 9:

$$L = \min_{\theta,\beta,\gamma} \|N_f(m_{j+1}, \phi) - N_F(N_f(m_j, \phi), \beta)\| + \|N_G(m_j, \gamma) - J\| \quad (9)$$

where $\phi$, $\beta$, $\gamma$ are the parameters of $N_F$, $N_f$, and $N_G$ respectively.

In the example of architecture 415, $\theta$ are the parameters received by the network $N_f$, $\rho_r$, $\rho_m$ and $\rho_r^+$, $\rho_m^+$ denote the system state at the current and subsequent timestep, respectively. Similarly, for clarity, with respect to the network $N_G$, G here indicates the observable-to-cost mapping.

Network $N_f$ is to learn the lifted observables as functions of the system inputs, an operation corresponding to the learning of appropriate coordinates in which to express the dynamics. The output 415d of the network Nr is as shown in EQN. 10 (one will appreciate that the selection shown here is just an example provided to facilitate the reader's comprehension)

$$\begin{bmatrix} f_r \\ f_m \\ f_\theta \\ f_r f_m \\ f_r f_\theta \\ f_m f_\theta \end{bmatrix} \quad (10)$$

where $f_r$, $f_m$, and $f_\theta$ are functions (observables) of the state dynamic variables $\rho_r$, $\rho_m$, and parameters $\theta$ respectively, for the current time step (the output 415f indicates the predicted values in the dictionary for the next time step and may be used as part of the loss function). In addition to these observables, the network $N_f$ may also learn the tensor products of the functions $f_r$, $f_m$, and $f_\theta$ via a custom layer $L_{prod}$ in the network $N_f$ having a learnable parameter $\alpha$ as shown in EQN. 11.

$$\mathcal{L}(f,g) = \alpha(f \otimes g) \quad (11)$$

The learnable parameter $\alpha$ may serve as a "knob" with which component 315a can regulate how much of the tensor product should be included in the learned coordinates. The internal structure of $N_f$ may thus consist of three separate branches each consisting of a series of fully connected layers. Each of these branches may then feed into corresponding tensor product layers and the outputs be then concatenated into a single vector of observables.

Figure 4D:
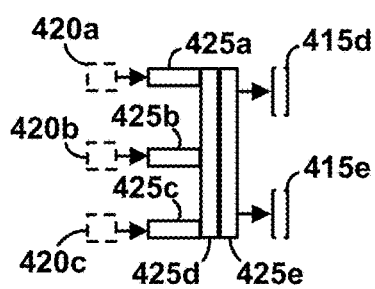
FIG. 4D is a schematic block architecture diagram depicting layers in an example implementation of the neural network $N_f$ of FIG. 4C, as may occur in some embodiments.

For clarity, FIG. 4D provides a schematic block architecture diagram depicting layers in an example implementation of the neural network N f of FIG. 4C. Here, branch 425a receives the inputs $\rho_r$ and $\rho_r^+$ 420a, branch 425b receives the inputs $\rho_m$ and $\rho_m^+$ 420b, and branch 425c receives the input $\theta$ 420c. Each of the branches 425a, 425b, 425c then feed into corresponding tensor product layers 425d (to produce the products appearing in the observable vector dictionary outputs 415d and 415e, e.g. in accordance with the custom layer $L_{prod}$ described above). Finally, the results may be concatenated via one or more concatenation layers 425e to produce the respective outputs 415d and 415e (which, one will appreciate, as a practical matter, may appear in a single vector output).

The representation network $N_F$ 415b may learn the dynamics of the lifted observable space. That is, $N_F$ 415b may receive the output 415d of $N_f$ and "map it forward", i.e., predict the values at a next time step (here represented by the result 415f when the mapping function F is applied via network $N_F$ 415b to the output 415d). As mentioned, the cost network $N_G$ 415c may be used to map the lifted observables back to a quantity of interest for use by a training optimizer (as indicated by the mapping to the result 415g).

Figure 4E:
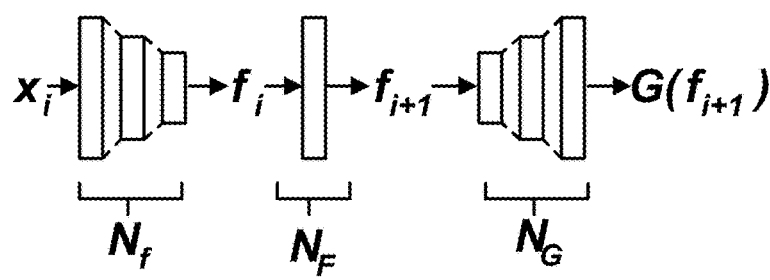
FIG. 4E is a schematic block architecture diagram depicting components in an example autoencoder neural network architecture corresponding to the neural network architecture of FIG. 4C, as may be implemented in some embodiments.

To facilitate comprehension, one will appreciate that the Koopman neural network of FIG. 4C could be construed as a form of an autoencoder structure with an additional intermediate layer for describing the dynamics. Specifically, FIG. 4E depicts this analogous representation wherein the $N_f$ network plays the role of an encoder and the network $N_G$ plays the role of a decoder. The dynamics here evolve within the space encoded by the $N_f$ network.

With this structure in mind, various embodiments employ the following loss functions, shown in EQNs. 12, 13, and 14, to training the networks $N_F$ 415b, $N_G$ 415c, $N_f$ 415a, respectively:

$$L_{N_F} = mse(F(f_i), f_{i+1}) \quad (12)$$

$$L_{N_G} = mse(G(f_i), J_i) \quad (13)$$

$$L_{N_f} = L_{N_F} + L_{N_G} + \frac{1}{\|f_i\|} \quad (14)$$

where one will appreciate that "mse" refers to the mean squared error as shown in EQN. 15

$$mse(x, y) = \frac{1}{n}\sum_{i=1}^{n}(x_i - y_i)^2 \quad (15)$$

and where $J_i$ (as appearing in EQNs. 9 and 13) are the "true" or "actual" data of the desired outputs to be learned.

The $L_{N_F}$ loss of EQN. 12 indicates how the network $N_F$ has captured the system's dynamics. Similarly, the $L_{N_G}$ loss of EQN. 13 indicates how well the lifted state can be decoded back into the form of the desired outputs. Accordingly, the loss of EQN. 13 may serve an important role, as the outputs from the network $N_G$ may be used to determine the cost function for the optimization routine (consequently, errors in N G may propagate throughout training if not carefully managed). Finally, the $L_{N_f}$ loss of EQN. 14 incorporates both the dynamics and decoding loss to encourage a selection of observables faithful to the dynamics, but also readily "decodable". EQN. 14 also includes the one-over-the norm term $$\frac{1}{\|f_i\|}$$

to mitigate against the system learning "trivial" observable selection which simply maps everything to zero.

Figure 5:
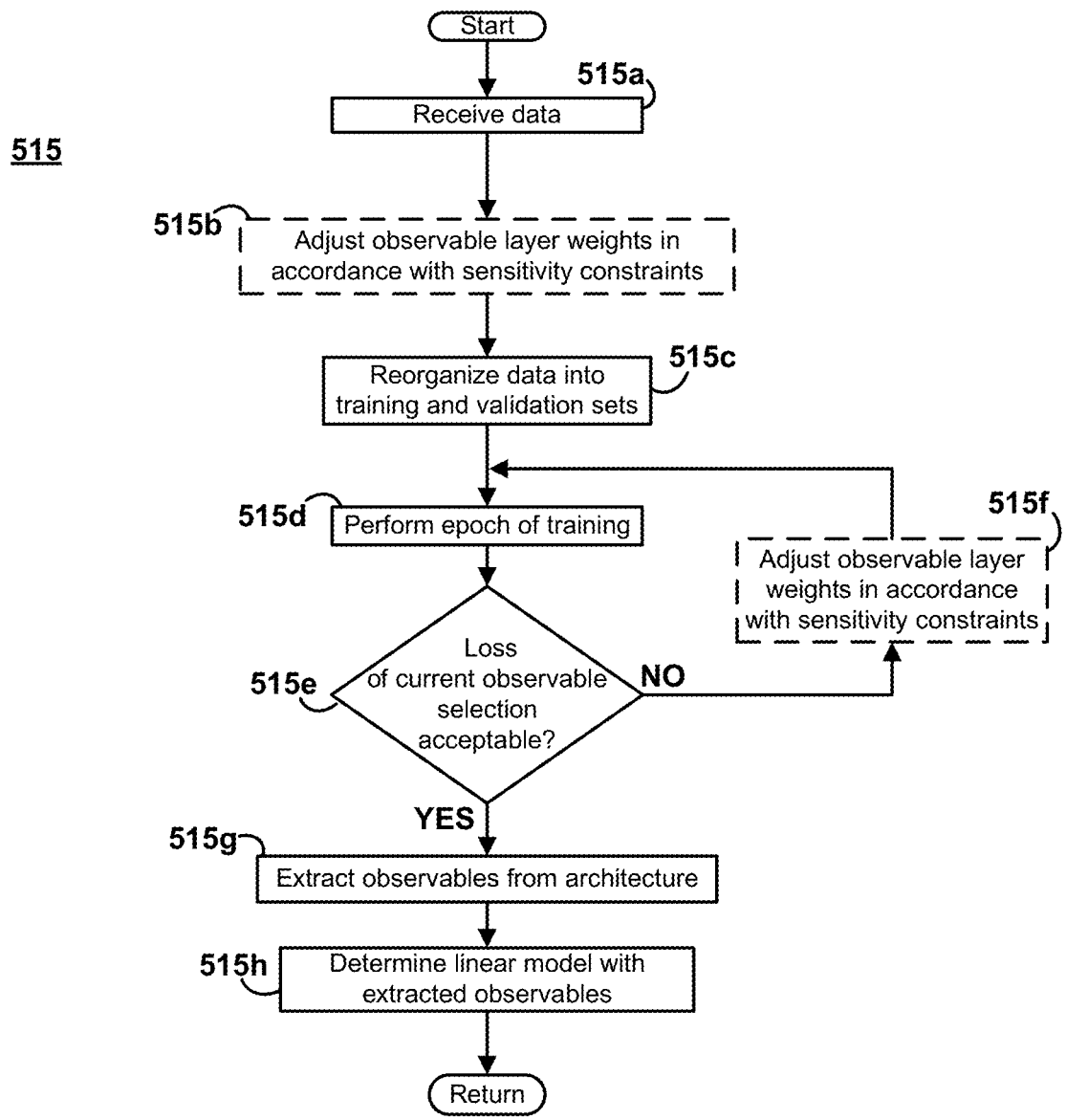
FIG. 5 is a flow diagram illustrating various operations in an example process for training a neural network, such as a network of FIGS. 4A-E, as may be implemented in some embodiments.

For further clarity, FIG. 5 is a flow diagram illustrating various operations in an example process 515 for training, e.g., the neural networks of FIGS. 4A, 4B, and 4C (one will appreciate that this process is merely one possible example and that variations will be readily recognized). In this example, at block 515a, the state decomposition component 315a may receive the data for determining the observable selection, e.g., all, or a portion, of the data 310g. At block 515c, the state decomposition component 315a may organize the data into training, validation, and in some embodiments, test sets of data. At blocks 515d and 515e, the state decomposition component 315a may iteratively train the architecture, e.g., the architecture 405, the architecture 410, or the architecture 415.

Once the state decomposition component 315a determines that the loss is acceptable at block 515e, the component may extract the observables from the architecture at block 515g and then prepare the linear lifted model using their representation at block 515h (e.g., place the observables and the data in a form usable by control logic).

As will be discussed in connection with FIGS. 7A and 7B, in some embodiment, the state prediction refinement component 315b may, either directly or indirectly, impose restrictions upon the choice of observables for the lifted representation. Specifically, as indicated at blocks 515b and 515f, in some embodiments, these constraints may be imposed during training to avoid convergence towards unacceptable choices of observables (for clarity, in some embodiments, only one of blocks 515b and 515f may be performed). For example, if the prediction refinement component 315b has indicated that certain observables must not be included in the final collection (either directly, or indirectly, e.g., by restricting the choice of parameters which may be considered), then at block 515b the weights affecting selection of those observables may be, e.g., removed or hardwired to prevent their selection at block 515g. In some embodiments, the weights may be retained, but their influence diminished at block 515f. In still other embodiments, neither block 515b nor block 515f may be applied, but rather, the restriction only imposed during extraction at block 515g. The imposition of such constraints may be especially pertinent during subsequent "update" applications of the LPCMS to an already deployed lifted controller. During such updates, radical changes in the character of the digital controller system may argue for a new choice of parameters or observables when preparing the lifted representation. In some environments, iterative updates to, or replacement of, deployed lifted predictive controllers, may be the most efficient way for determining a more effective selection of parameters and observables (the desire for such adjustment being recognized, e.g., by prediction refinement component 315b).

Lifted Digital Twin Model Creation for Lifted Predictive Controllers

As mentioned with respect to component 315o, in some embodiments, rather than proceed directly to creating a lifted representation for the dynamics of the entire digital controller system, the LPCMS may first create lifted digital twin models for one or more of the digital controllers in the digital controller system (or in some embodiments, digital twins for a portion of the digital controller, such as its internal model). Also as indicated, where multiple digital twins have been created for individual corresponding digital controllers, the digital twins may likewise be "wired" together to form an aggregate lifted digital twin representing their cumulative interaction. As lifted models may facilitate the computation of further extended predictive horizons than traditional non-lifted models, the usage of lifted representations of the digital controllers may itself facilitate a more accurate representation of the digital controller system as a whole. While the digital twins may themselves be used as the lifted predictive control model 315l, in some embodiments, digital twins may also facilitate simulations of a digital controller's behavior and provide synthetic training data for creation of a lifted representation of a broader portion of the digital system (e.g., a larger, aggregate model of system dynamics which includes the digital controller as a subcomponent).

As an example of digital twin creation provided to facilitate understanding, FIG. 6A is schematic block diagram depicting an example digital controller topology within a digital controller system 605a (e.g., one of systems 205a or 210a). The LPCMS may seek to create a lifted predictive controller for the system 605a as a whole. However, to do this, the LPCMS may first seek to create intermediate digital twin models of the system's subcomponents (such hierarchic relationships may be specified to the LPCMS by a designer, by metadata in a communication protocol of the digital controller system, by implementation specifications of the digital controller system, etc.). In this example, a global digital controller 610a may monitor the physical system and provide commands 605d, 605e, 605f to local digital controllers 610b, 610c, and 610e, respectively. As mentioned, some controllers may include their own model representation of the physical dynamics (e.g., in this example, controller 610e includes a model 610f).

In preparing one or more lifted predictive controllers of the entire digital controller system, the LPCMS may first create one or more of the following lifted digital twin models: a lifted digital twin 605b characterizing the dynamics of controller 610a; a lifted digital twin 605g characterizing the dynamics of controller 610b; a lifted digital twin 605j characterizing the dynamics of controller 610c; a lifted digital twin 605k characterizing the dynamics of controller 610d; and a lifted digital twin 605i characterizing the dynamics of controller 610e. In some embodiments, where the LPCMS has access to the local digital model 610f (and corresponding temporal data), a digital twin for the model 610f may also be created. Similarly, in this example, the controller 610c directs or provides inputs to the controller 610d. Consequently, the temporal data and operation of controllers 610c and 610d may be considered together by the LPCMS so that their corresponding lifted digital twins 605j, 605k may be "wired" together, or alternatively, the LPCMS may represent their combined operation via a single lifted digital twin 605h. For example, if the controller 610c outputs a velocity of an energy plant, which is the input of the digital controller 610d, then even if the digital controllers 610c and 610d do not exchange signals directly, the lifted digital twins 605j, 605k created by the LPCMS may be "wired together" or associated with a single lifted digital controller.

Figure 6B:
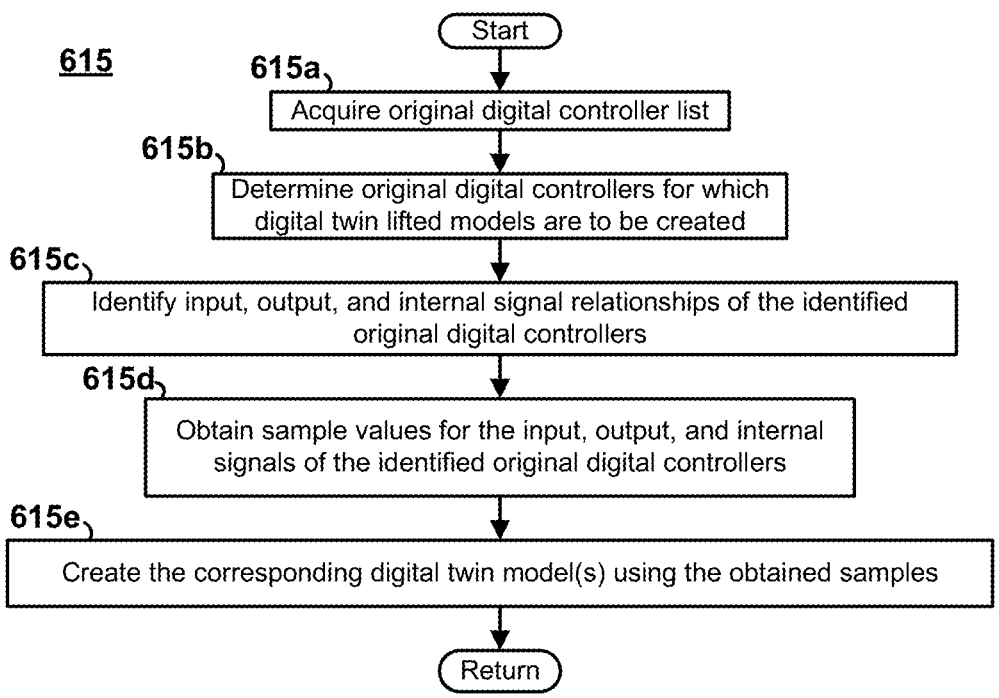
FIG. 6B is a flow diagram illustrating various operations in a digital twin lifted model creation process, as may be implemented in some embodiments.

FIG. 6B is a flow diagram illustrating various operations in a digital twin model creation process 615, as may be implemented in some embodiments of the LPCMS. At block 615a the LPCMS may acquire a list of the applicable digital controllers in the digital controller system (again, from, e.g., a designer-supplied specification, metadata from the digital controller system, a design specification from a digital manifest, etc.). For example, the LPCMS may obtain a list of ECUs, at least some of which are linked, as determined by interface control documents (ICDs). Such interface documents, like other metadata, may provide "semantic meaning" to the input and output signals of the various digital controllers in the digital controller system.

At bock 615b, the LPCMS may determine which of the digital controllers it will model with lifted digital twin models. Such a determination may, e.g., be obtained based upon simulation conditions of an ECU to be tested, specified by a designer, feedback from past deployments, etc. At bock 615c, the LPCMS may determine one or more of the input, output, and internal signal relationships of the identified digital controllers. For example, where ICDs are available, the LPCMS may infer connections between the digital controllers from these documents. One will appreciate that the accuracy of the lifted models may depend upon the amount of data available, the choice of observables (e.g. the network architecture), etc. Accordingly, in some embodiments, the LPCMS may predicate the decision to create a digital twin upon several factors, such as the availability of temporal data, feedback regarding the accuracy of deployed lifted controllers, the number of connections between the controller and other portions of the system, etc.

At bock 615d, the LPCMS may acquire data for the signals selected at block 615c, for each of the identified controllers. For example, this may involve translating CAN message bus data, JSON data, etc. from the digital controllers into a format amenable to determining the one or more lifted representations. Finally, at block 615e, the system may train the one or more digital twin models (i.e., determine the lifted representation) using the data identified at block 615d.

Example Lifted Parameter Optimization

As discussed herein, one will appreciate that, in some embodiments, interactions between the prediction refinement component 315b and state decomposition components 315a may be iterative, as represented by arrows 340a and 340b. Specifically, state decomposition component 315a may produce an initial observable selection and lifted model, which prediction refinement component 315b may then determine is improperly sensitive (e.g., the selectable digital control system parameter, or resulting observable selection, does not robustly predict the behavior of the digital control system), and send the choice back to state decomposition component 315a for selection of new parameters or new observables for a new lifted model (e.g., to retrain a network, but now imposing constraints on the choice of input parameters or dictionary of observables). This iterative process may continue until prediction refinement component 315b finds that the model's parameters produce an adequate level of accuracy in predicting the behavior of the digital control system (as a whole, or a subcomponent, as when preparing a lifted digital twin of a digital controller). For example, a portion of the data 310g at a first granularity (e.g., via interpolation or down-sampling) may be used for training a neural network to determine a lifted representation in component 315a. A second portion of the data 310g at a second granularity (e.g., via interpolation or down-sampling) may then be used for verification at component 315b. Where component 315b finds the lifted model to be insufficiently predictive of its data, it may refer the model back to component 315a, identifying, e.g., the most erroneous observables for removal from the next generated lifted model.

Figure 7A:
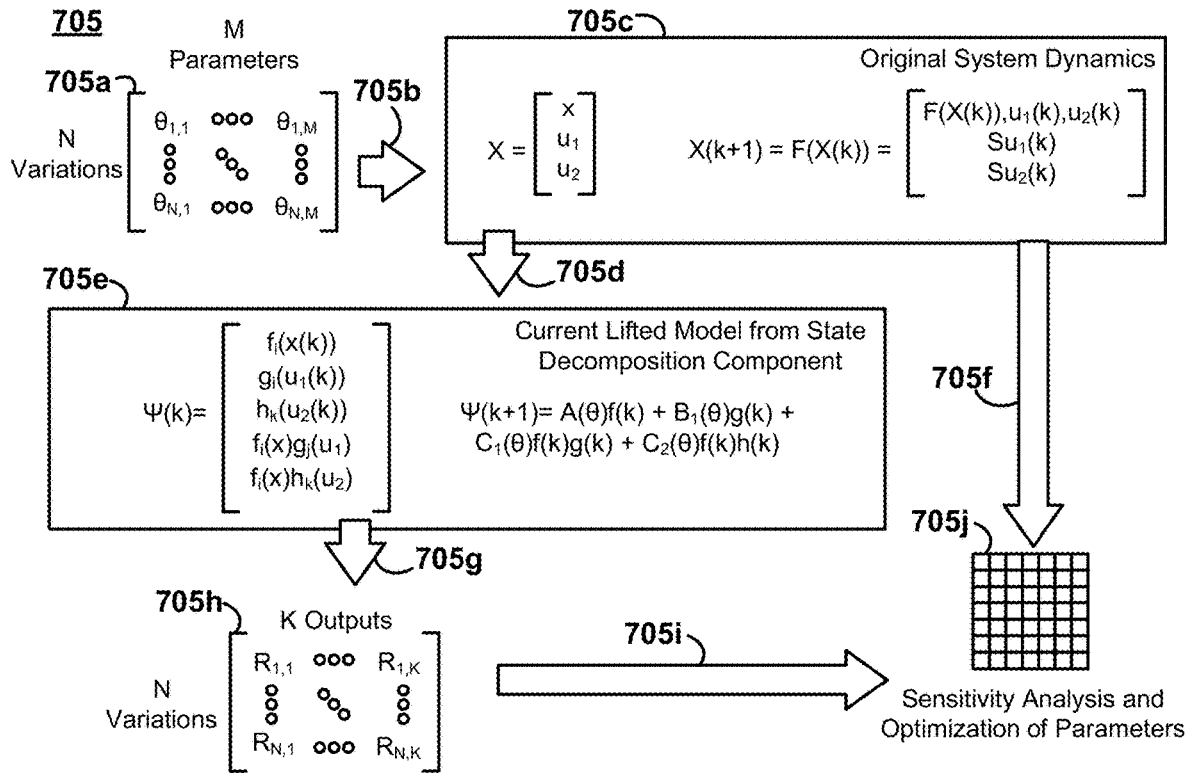
FIG. 7A is a schematic block diagram illustrating various operations in an example process for determining optimal parameter sets in a parameter-specific lifted model (e.g., as shown in FIG. 3E), as may be implemented in some embodiments.

For further clarity, FIG. 7A is a schematic block diagram illustrating various operations in an example process 705 for determining optimal parameter sets in a parameter-specific model, e.g. one of the models 320b, 320c, 320d, as may be implemented in some embodiments of the prediction refinement component 315b. Similarly, FIG. 7B is a schematic block diagram illustrating various operations in an example process 710 for determining optimal parameter sets in a parameter-accepting model, e.g., the model 330a, as may be implemented in some embodiments of the prediction refinement component 315b. One will appreciate that optimizations of this nature, but in a different context, are discussed in Avila, A. M., Fonoberova, M., Hespanha, J. P., Mezić, I., Clymer, D., Goldstein, J., & Javorsek, D. (2021, May). Game Balancing using Koopman-based Learning. In 2021 American Control Conference (ACC) (pp. 710-717). IEEE.

Specifically, in both processes 705 and 710, the temporal data (e.g., all, or a portion, of the data 310g) may be arranged into a tensor 705a of M parameters and N variations. For example, M may be the total configurable characteristics (the parameters, such as the types of hospital services available) of the digital controller system, while the N variations may be the each of the different value variations of each configuration. As previously discussed, the temporal data 310g may be acquired (705b and 710b, respectively) in the context of an original representation of the system dynamics 705c or 710c (for clarity, in 710c θ is here multiplied by the identity matrix "I"). The operations 705d, 710d of the state decomposition component 315a here produce corresponding lifted representations 705e, 710e, respectively. The lifted models 705e, 710e may be used to create 705g, 710g a new set of predicted outputs for the respective variations, 705h, 710h. The prediction refinement component 315b may then, e.g., compare 705j, 710j a sensitivity analysis of the original system dynamics 705i, 710i with a sensitivity analysis of the one or more lifted models 705f, 710f to ensure that the lifted models' sensitivity matches the original system's sensitivity. In some embodiments, where the lifted model is a reduced order surrogate model, and consequently more efficient linear structure for repeated execution (e.g., the linear evolution matrix can be evolved a desired number of times through successive multiplication), optimization routines employed by the LPCMS may use the lifted model to search for an optimal set of model parameters meeting a constraint criteria, while maximizing/minimizing an objective function. Accordingly, in some embodiments, prediction refinement component 315b compares the original system dynamics data, with the predicted data to perform a sensitivity analysis. For example, the sensitivity analysis may be an Analysis of Variance (ANOVA).

Figure 8:
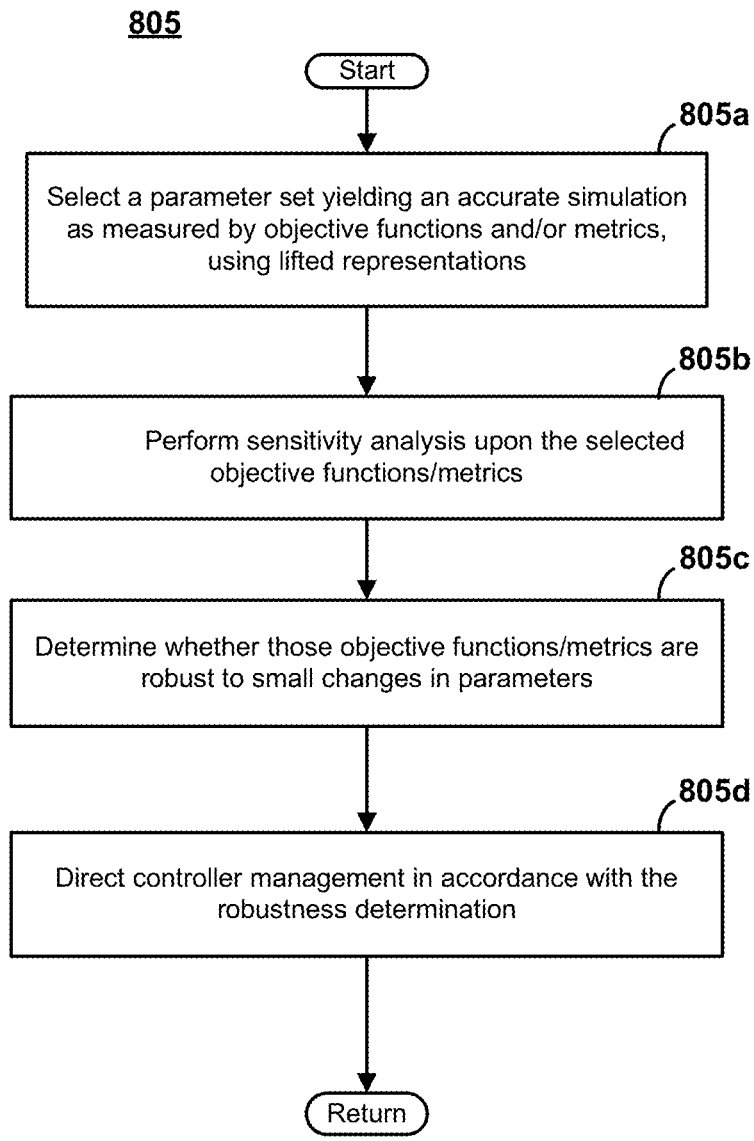
FIG. 8 is a flow diagram illustrating various operations in an example process for assessing parameter selection sensitivity, as may be performed in some embodiments.

Thus, in some embodiments the LPCMS may include a computer system configured to determine a robustness of balanced sets of simulation data. For clarity of comprehension, FIG. 8 is a flow diagram illustrating various operations in a process 805 for assessing observable selection sensitivity, as may be performed in some embodiments. Specifically, at block 805a, the LPCMS may select a parameter set yielding an accurate simulation, as measured by objective functions and/or metrics, using their lifted representations. At block 805b, the LPCMS may then perform a sensitivity analysis upon the objective functions/metrics selected at block 805a. At block 805c, the LPCMS may determine whether the objective functions/metrics are robust to small changes in parameters, based upon the sensitivity analysis. At block 805d, the LPCMS may then act upon the robustness results, e.g., allowing processing to proceed to controller creation, directing that more training and new observables be found, presenting the robustness analysis results in tabular or graphical format for a human designer to decide whether to proceed, submitting restrictions to the state decomposition component 315a for a new lifted representation creation, etc.

As discussed above, in some embodiments the LPCMS may assess virtual simulations, creating and deploying lifted controllers, before being deployed in an actual digital controller system. Thus, the example sensitivity analysis process 805 discussed in FIG. 8 may be accomplished in some embodiments by executing a simulation specifically prepared for a sensitivity comparison with the lifted results. In some embodiments, the sensitivity analysis may be performed by executing a trained model from a family of Koopman operator models parametrized by input parameters, or, in some embodiments, by execution of a trained model which is a single Koopman operator model. Such a model may be, e.g., a deep learning model (e.g., analogous to the discussion with respect to FIGS. 4A-E), but also, in some embodiments, a more traditional machine learning model, such as a support vector machine, logistic regression classifier, random forest, etc.

Example Iterative Model Generation and Lifted Parameter Optimization

Figure 9A:
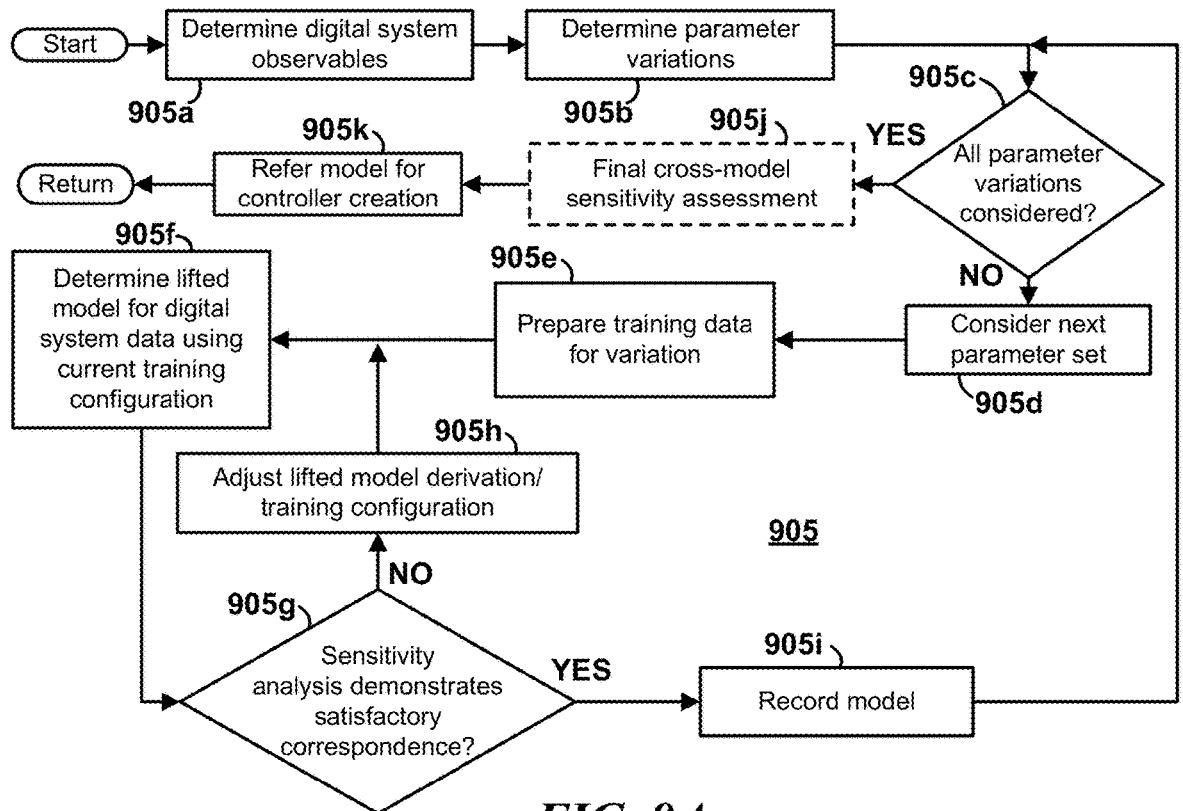
FIG. 9A is a flow diagram illustrating various operations in an example process for producing a parameter-specific model index (e.g., as shown in FIG. 3E) with robust parameter sets, as may be implemented in some embodiments.
Figure 9B:
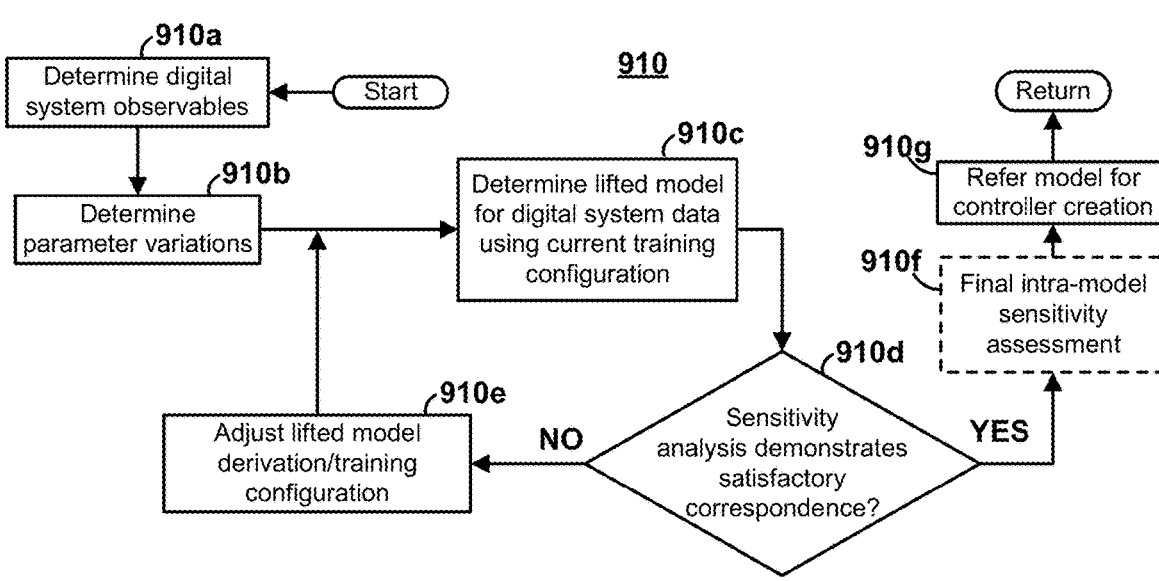
FIG. 9B is a flow diagram illustrating various operations in an example process for producing a parameter-accepting model (e.g., as shown in FIG. 3D) with robust parameter sets, as may be implemented in some embodiments.

For further clarity, FIGS. 9A and 9B provide flow diagrams illustrating various operations in example processes 905, 910 for producing a parameter-specific lifted representation model, or lifted digital twin model, index (e.g., as shown in FIG. 3E) and parameter-accepting lifted representation model, or lifted digital twin model, (e.g., as shown in FIG. 3D), respectively, each with robust parameter sets, as may be implemented in some embodiments. In process 905, the LPCMS may determine the initial, non-lifted observables from the data 310g at block 905a, and the parameter variations of the digital controller system at block 905b (e.g., from metadata, by observing the type and number of datasets from the digital system, etc.). At block 905c the system may iterate through the sets of parameter variations at block 905d and prepare corresponding training data sets for determining lifted representations at block 905e. The system may then proceed to block 905f, determining lifted observables and models using the state decomposition component 315a.

Figure 7B:
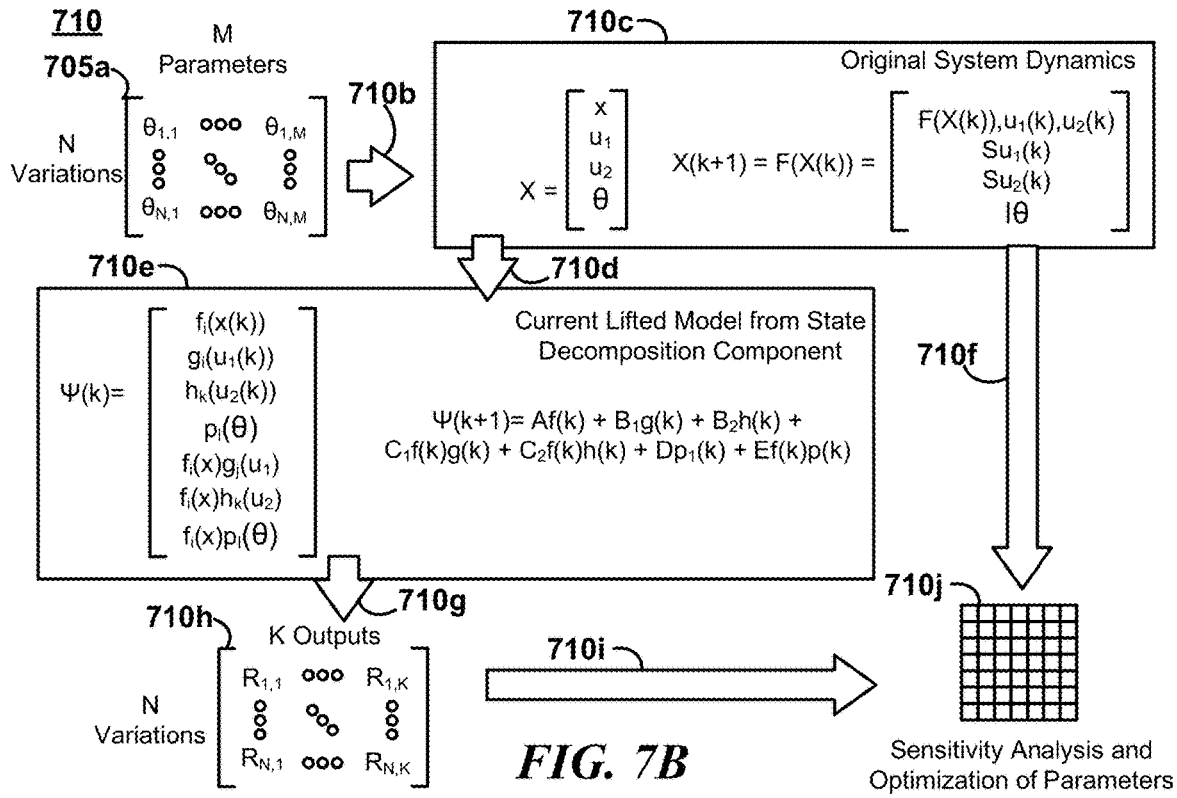
FIG. 7B is a schematic block diagram illustrating various operations in an example process for determining optimal parameter sets in a parameter-accepting lifted model (e.g., as shown in FIG. 3D), as may be implemented in some embodiments.

At block 905g, the LPCMS may refer 340a the model to the prediction refinement component 315b for assessment, e.g., in accordance with the processes of FIGS. 7A and 7B. If sensitivity analysis demonstrates that the lifted model does not yet adequately corresponding to the data at block 905g, then the training in the state decomposition component 315a may be adjusted at block 905h, e.g., in accordance with blocks 515b and 515f. New training may then be performed at block 905f to identify a new lifted representation. Once the model is found satisfactory at block 905g, the LPCMS may record the model at block 905i, e.g., as one of the models 320b, 320c, 320d in the index 320a. Once all the parameter variations are considered at block 905c, then at block 905k, the system may refer 340c the models to the control command planning component 315c for creation of a corresponding lifted control command planner 315m. In some embodiments, the models within the index may be compared at block 905j to further determine if adjustment is desired. For example, different indexed models may be compared to see if different parameters precipitate retrieval of the same model, thereby identifying a possible opportunity for consolidation. Similarly, parameters may be substituted or adjusted based upon additional sensitivity analysis.

In process 910, the LPCMS may similarity first determine the digital controller system observables to consider at block 910a from data 310g and the parameter variations at block 910b (again, from metadata, consideration of the data itself, etc.). With these selections, the lifted representation may be iteratively determined and adjusted at blocks 910c, 910d, and 910e. Specifically, the state decomposition component 315a may determine a lifted representation at block 910c. Where the state prediction refinement component 315b determines that the current lifted representation is not satisfactory at block 910d, then the LPCMS may perform additional adjustments at block 910e. The system may, e.g., adjust the neural network architecture (e.g., the architecture of one of FIGS. 4A-E), increasing the dimension of a delay-embedding, or other hyperparameters. Once the state prediction refinement component 315b determines that the current lifted representation is satisfactory, the prediction refinement component 315b may refer 340c the lifted model for controller creation, at block 910g. In some embodiments, an intra-model sensitivity assessment may be first performed at block 910f. At block 910f, parameter correspondences may, e.g., be adjusted based upon a sensitivity analysis determined based upon the data 310g.

Example Controller Implementation

Figure 10:
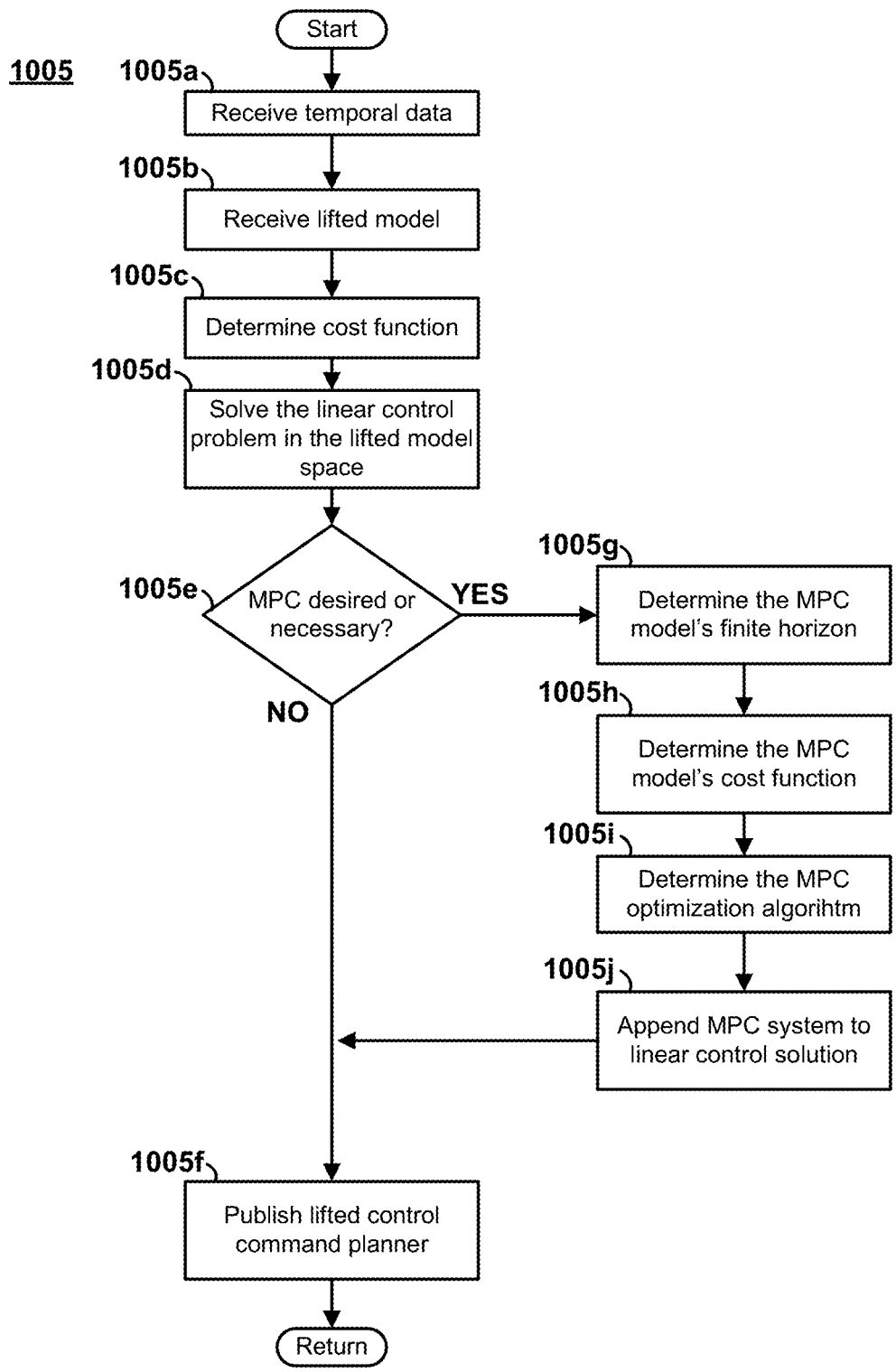
FIG. 10 is a flow diagram illustrating various operations in an example process for creating a lifted control command planner, as may be implemented in some embodiments.

FIG. 10 is a flow diagram illustrating various operations in an example process 1005 for creating control logic, e.g., creation of the Lifted Control Command Planner 315m by component 315c, as may be implemented in some embodiments. Specifically, at block 1005a, control command planning component 315c may receive the temporal data 310g. Similarly, at block 1005b, the control command planning component 315c may receive 340c the lifted model determined following the iterations between the state prediction refinement component 315b and the state decomposition component 315a.

At block 1005c, the system may determine the cost function to be used in preparing the lifted controller logic. For example, the designer may specify one cost function for a species of ECU, another cost function for another parameter model selection, a cost function for the global as opposed to local behavior, etc.

At block 1005d, the control command planning component 315c may, e.g., solve the linear control problem using this cost function in the lifted space of the model. As the representation may now facilitate a linear operator, methods in transport theory, regression, linear programming, etc. may also be used in the solution of block 1005d.

At block 1005e, the component 315c may consider whether Model Predictive Control (MPC) should be additionally applied to the logic determined at block 1005d. If not, the control logic as determined at block 1005d may be published as the planner 315m at block 1005f (this may include, e.g., adjust the control logic outputs to the appropriate message format of the digital control system). Where MPC is determined to be desired or necessary at block 1005e (for example, in some embodiments an engineer may manually specify that MPC is to be performed before the system deployed, or to be performed under specific conditions, analogous, e.g., to the engineer's selection of a cost function), the system may instead first create and append MPC control logic to the logic determined at block 1005d before publishing the planner at block 1005f. Specifically, at block 1005g, the system may determine the MPC model's finite prediction horizon. At block 1005h, the system may determine the MPC model's cost function (e.g., in the same manner as at block 1005c). At block 1005i, the system may determine the MPC optimization algorithm. At block 1005j, the systems may finally append the MPC system to the linear control solution determined at block 1005d. MPC control logic prepared for a lifted representation is referred to herein as K-MPC.

Example Index Interpolation

Figure 11:
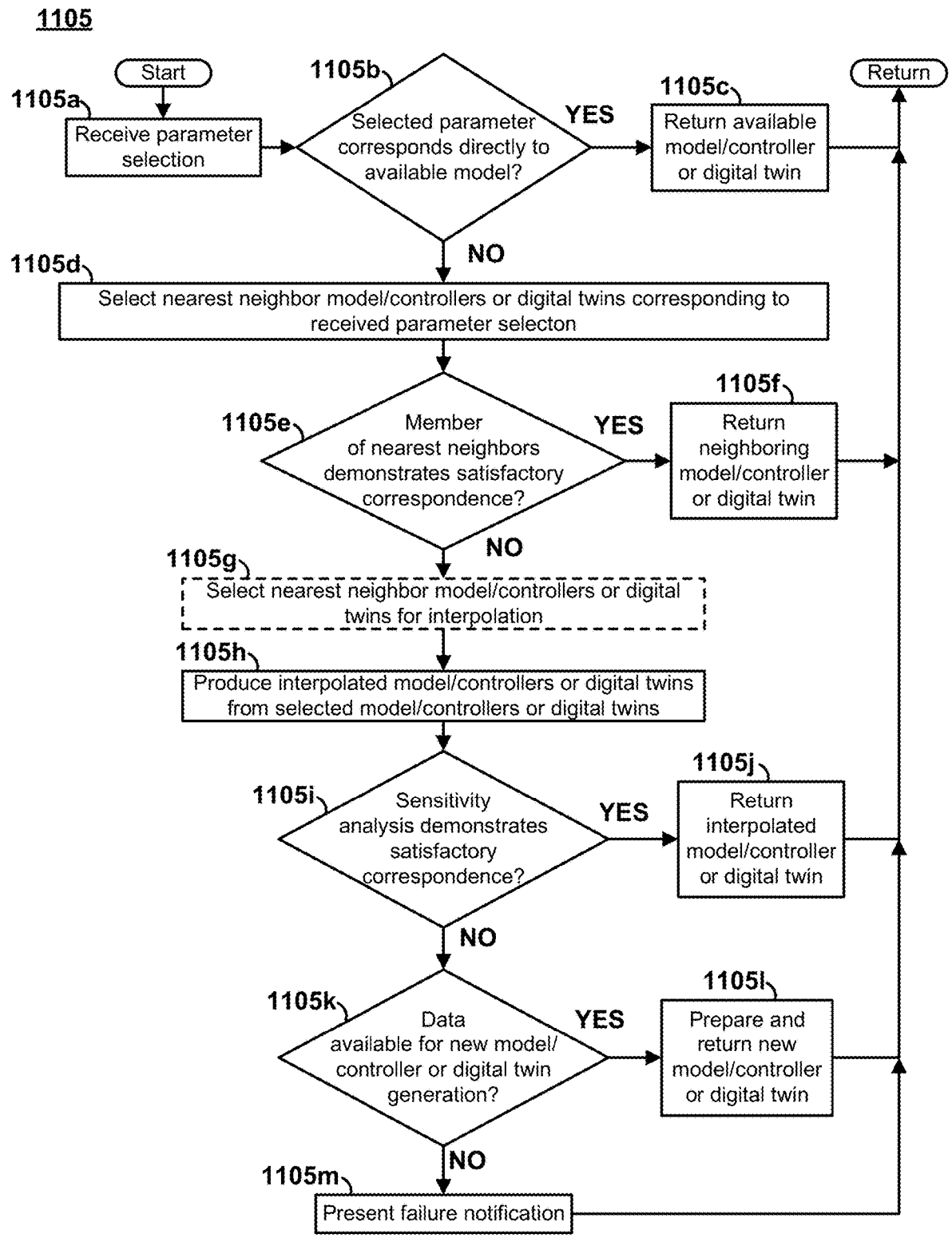
FIG. 11 is a flow diagram illustrating various operations in an example process for selecting a parameter-specific digital twin model (or, e.g., a model-controller pair) from an index (e.g., as shown in FIG. 3E), as may be implemented in some embodiments.

FIG. 11 is a flow diagram illustrating various operations in an example process 1105 for selecting a parameter-specific lifted representation, or a digital twin model, from an index (e.g., as shown in FIG. 3E), as may be implemented in some embodiments. During deployment of the lifted predictive controllers implementing indexed models and controllers, e.g., in parameter based index 320a, it may often be the case that the parameters encountered by the lifted predictive controllers are not exactly the same as any parameter key in the index. Naturally, this may also occur for digital twins of digital controllers. In these situations, it may be desirable to return a result corresponding to nearest neighbor parameter index, an interpolated result, or to prepare a new entry in the index specific to the received parameter.

Specifically, in the example of process 1105, software, firmware, or hardware managing an index, such as parameter based index 320a, may receive a parameter selection at block 1105a (e.g., a request from the index 320a). For example, central dispatch server 210d and local shipping dispatch system 210e may have received data indicating a number of hospital services online or a number of crane types available. This information may have been conveyed to a LPCMS. Similarly, an ECU in example vehicle system 205b may have received data indicating a change in road, tire, or fuel characteristics. At block 1105b, the system may consult the index to see if these parameters already appear as a key to a controller/model, digital twin of a controller, etc. If the parameter request exactly matches a key in the index, then the system may return the lifted model/controller or lifted digital twin in the corresponding index value at block 1105c, as the lifted materials were previously created based upon data collected in this same parameter configuration.

However, rather than simply fail when no key within the index matches the provided parameters, in some embodiments, the system may attempt to provide a solution based upon entries in the index. For example, at block 1105d, the system may determine the parameter indices which are "nearest neighbors" to the received parameter values. A Euclidean distance may be taken between the parameter arrays in the index and the received parameter, a Levenshtein distance type metric, etc. to identify the parameter keys "closest" to the requested parameter input from block 1105a. In some embodiments only the two nearest neighbors may be considered, but other embodiments may consider more index items. For example, a distance metric, such as one of the Euclidean or Levenshtein metrics presented above, may be used in combination with Gaussian kernels centered upon each parameter array in the index. In this manner, parameter values, weighted by the kernel, may be used to determine the similarity between each indexed parameter array and a new parameter array. In some implementations, one may normalize the sum of these similarity measures to one and thereby form a convex combination of the stored models. One will appreciate that kernels other than the Gaussian kernel mentioned above (e.g., appropriately modified logistic kernels, uniform kernels, etc.), may be used in some embodiments.

Having identified one or more of the nearest parameter indices corresponding to the input received at block 1105a, at block 1105e, the system may determine whether the lifted materials corresponding to these nearest neighbor indices demonstrate adequate correspondence. For example, if each of the nearest neighbor models produce sufficiently similar results within the prediction horizon of the request, then the lifted materials corresponding to the nearest neighbor most similar to the input may be returned at block 1105f (and may be entered into the index for future requests). In some embodiments, the system may instead return all the nearest neighbors, so that a weighted sum of their results (e.g., weighted by their distance from the input of block 1105a) may be returned.

If the nearest neighbors do not adequately correspond at block 1105e, the system may instead produce an "interpolated model" at block 1105h from the selected models block 1105d (or from a set selected specifically for this purpose at block 1105g, as, e.g., the set from block 1105g may be allowed to include more members than at block 1105d). Interpolation, may here be accomplished, e.g., by applying incoming data to each of the lifted materials and then estimating an average (e.g., weighted by their distance, as described above) of their respective responses. However, interpolation may also be accomplished by producing a model using training data from all of the neighboring parameter sets, if such data is available.

In some embodiments, rather than return this interpolated response directly following its creation, the system may instead first verify that the interpolated model is suitable. Accordingly, at block 1105i, the system may confirm that sensitivity analysis (e.g., based on correspondence with validation data, or as discussed herein with reference to FIG. 7A) validates that the interpolated model is satisfactory, and designates the interpolated lifted materials be returned at block 1105j (and may be entered into the index for future requests).

If the interpolated model is not satisfactory at block 1105i, in some embodiments, at block 1105k the system may consider whether it has access to enough data under the new parameter configuration from block 1105a to generate new lifted materials specific to that request at block 1105k (e.g., for the LPCMS to generate the model and controller in accordance with the operations of FIGS. 3A and 3B). If so, the resulting material may be returned at block 1105l (and may be entered into the index for future requests). In the depicted example, only if these other attempts fail, will the system present a failure notification at block 1105m. However, one will appreciate that over time, though the failure of block 1105m is presented, eventually enough data may be available for creation of new materials which can be returned at one of blocks 1105c, 1105f, 1105l, or 1105l (e.g., with iterative interpolated material creation, more nearest neighbors may be subsequently available to facilitate future lifted material creation).

Example Deployed Controller Management

Figure 12:
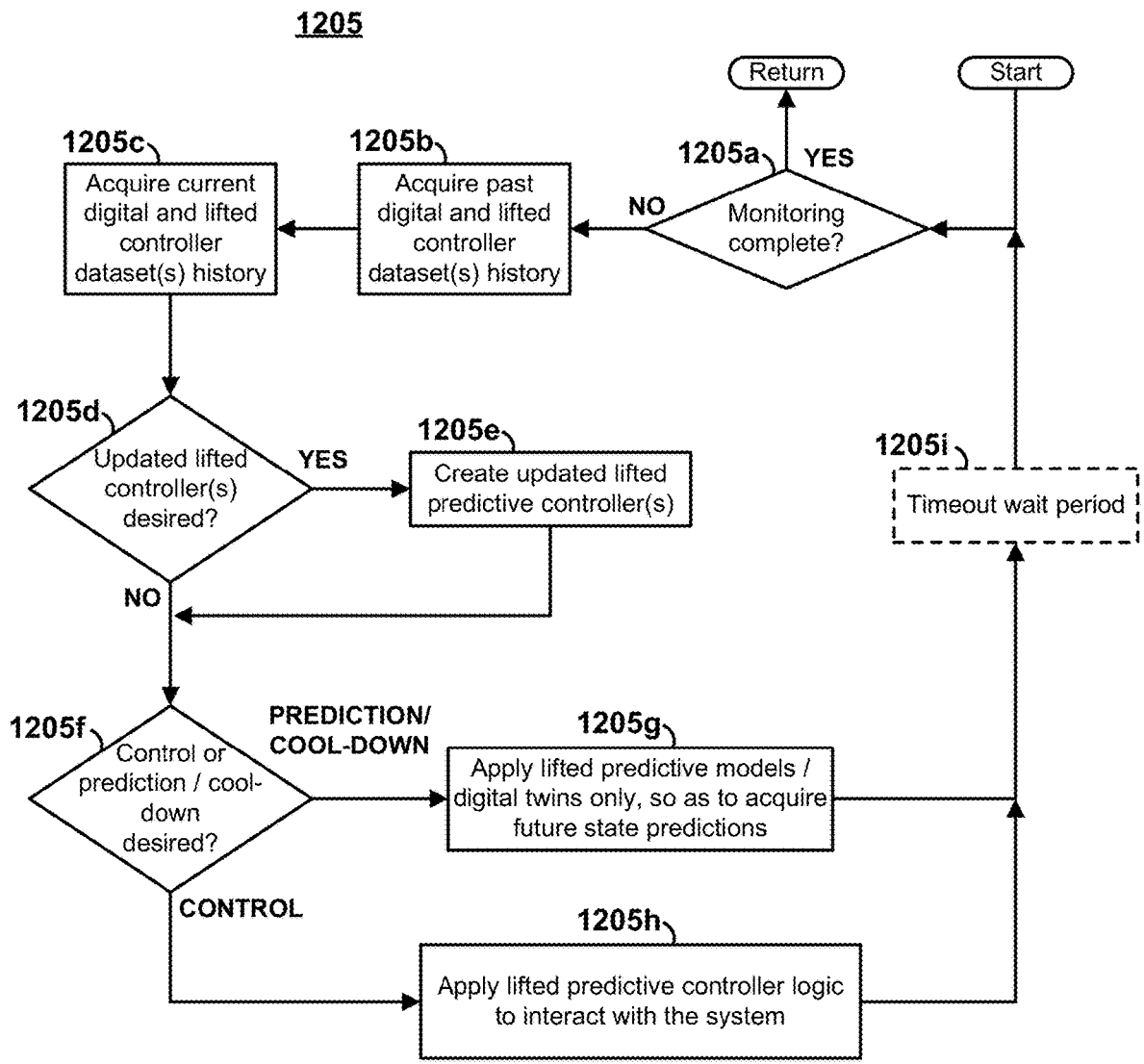
FIG. 12 is a flow diagram illustrating various operations in an example process for online management of a lifted predictive controller once deployed to interface with a digital system, as may be implemented in some embodiments.

Following deployment 315p, in some embodiments, the LPCMS may continue to monitor the deployed lifted predictive controllers (as well as lifted digital twins of digital controllers) to consider whether adjustment may be needed. For example, FIG. 12 is a flow diagram illustrating various operations in an example process 1205 for online management of one or more lifted predictive controllers, as may be implemented in some embodiments.

Initially, at block 1205a the monitoring system may determine if monitoring is no longer necessary (e.g., the digital controller system is discontinuing operation) and conclude its operations if so. While monitoring continues, at block 1205b, the system may collect the lifted and digital controller data history and the current lifted and digital controller state at block 1205c.

At block 1205d, the system may consider whether additional or replacement lifted predictive controllers should be created, and if so, create and deploy the lifted controllers at block 1205e. One will appreciate that "updating" a deployed lifted controller may involve replacing only a portion of the lifted controller, or adjusting a portion of an already deployed lifted controller (e.g., with an over-the-air update), rather than a wholesale substitution (though substitution may be appropriate in situations where the update is so substantive as to render the existing controller obsolete). Similarly, one will appreciate that, new, interpolated controllers (as described elsewhere herein, e.g., with reference to FIG. 11) may also be created as determined at block 1205e. The LPCMS may include logic configured to determine when a lifted controller, or constituent digital twin, is becoming outdated. For example, the system may monitor the controller's ongoing fidelity by assessing the degradation between the lifted controller and the digital control system's behavior. Should an error between the predicted state, or response, of the lifted material and the digital system exceed a desired performance threshold (e.g., if the error exceeds a predefined limit over a fixed number of consecutive time periods), the system may perform an "on-the-fly" retraining of the controller's model using data collected from blocks 1205b, 1205c. Such ongoing maintenance may facilitate a time-dependent model of the system's dynamics integrated within an MPC framework (e.g., as created in FIG. 10).

In some embodiments, the LPCMS may transition from block 1205d upon a "NO" determination to block 1205a. In the depicted example, however, at block 1205f, the system may consider whether the deployed lifted models and controllers should be used only for prediction of the digital control system's operation (e.g., where the existing digital controllers are adequately managing the system without the assistance of the lifted digital controllers), or whether control via all or some of the lifted predictive controllers is appropriate (e.g., where prediction has indicated that an adverse situation may be averted via minimal, temporary intervention by only some of the lifted controller(s), then those specific controllers may be activated by the LPCMS accordingly). As another example, a user monitoring the deployment may wish to simply forecast future states of the system by observing digital twin models within various of the lifted predictive controllers. Such digital twin monitoring may be especially useful where the engineer is contemplating a design or adjustment to the system. By simulating the behavior of individual known components (e.g., installed ECUs) the engineer may better anticipate how to best integrate new components (e.g., new ECUs still in the design process). In this manner, integration may even be possible in live, rather than simulated, environments. The faster simulation speed of lifted representations may also allow one to more quickly test, validate, and redesign traditional digital controllers than would have been previously possible.

Where prediction without control is desired, e.g., for the above purposes, the LPCMS may transition to block 1205g to foresee the future state of the digital controller system. Alternatively, where control is also desired, the LPCMS may direct the application of the lifted predictive controllers at block 1205h.

Following the decision of block 1205f, some embodiments may impose a timeout period at block 1205i so as to provide the digital controller system and lifted predictive controllers time to stabilize. Hysteresis and other dynamical properties, such as the number of delays used while creating the lifted predictive controls, may limit the speed with which both the controllers may deploy their commands and the process 1205 may review and respond to the system's progress. Similarly, chaotic properties may emerge over time following too much intervention, and so some systems may benefit from periods without lifted controller intervention at block 1205h, so as to avoid such emergent behavior. Similarly, cool-down periods may bring the system closer to its native state, making the predictions of block 1205g more accurate. In some embodiments, the LPCMS may determine the duration of the cool-down by iteratively selecting block 1205g until the predicted and actual states of the system correspond within a desired threshold for a desired period of consecutive iterations.

Prototype Embodiment Results

Figure 13A:
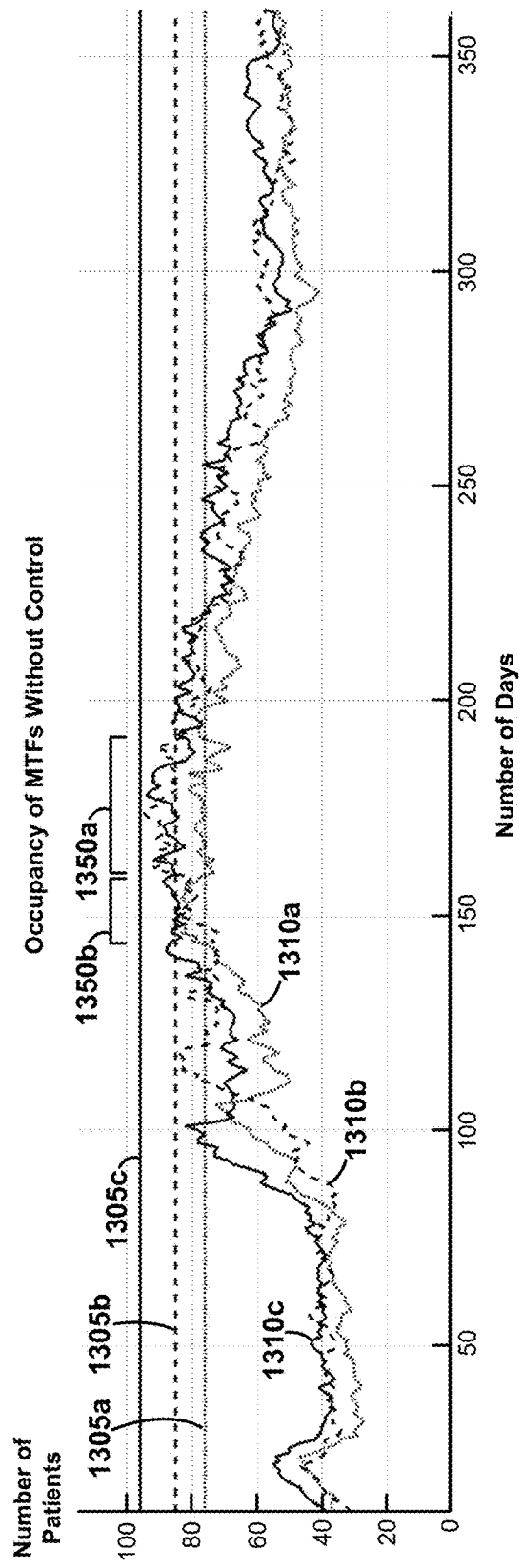
FIG. 13A is a plot of patient occupancy in a healthcare resource allocation digital system simulation, without application of a prototype lifted digital controller implementation as disclosed herein.

To further facilitate comprehension and appreciation of certain of the disclosed embodiments, FIG. 13A is a plot of patient occupancy across several simulated Medical Treatment Facilities (MTFs) managed by a central logistics system without application of a lifted controller generated in accordance with a disclosed embodiment. The horizontal lines 1305a, 1305b, 1305c indicate the maximum occupancy for each of the three facilities, whose corresponding occupancies over time are reflected by plots 1310a, 1310b, 1310c, respectively. The system has been subjected to a patient inflow commensurate with pandemic dynamics (e.g., as would be expected under Covid-19) over a year-long time horizon. Consequently, as indicated by plots 1315a, 1315b, the MTFs associated with horizontal lines 1305a, 1305b respectively endured periods wherein they exceeded their maximum occupancy. For example, the MTF associated with plot 1310b and horizontal line 1305b experiences a period of overcapacity between approximately days 160 and 190 (as indicated by reference 1350a). The MTF associated with plot 1310a and horizontal line 1305a likewise experiences occasional days of overcapacity in this period between approximately days 160 and 190 as well as between approximately days 140 and 160 (as indicated by reference 1350b). While the MTF associated with plot 1310c and horizontal line 1305c does not exceed its capacity during the year, it very nearly does so during the period indicated by reference 1350a.

Figure 13B:
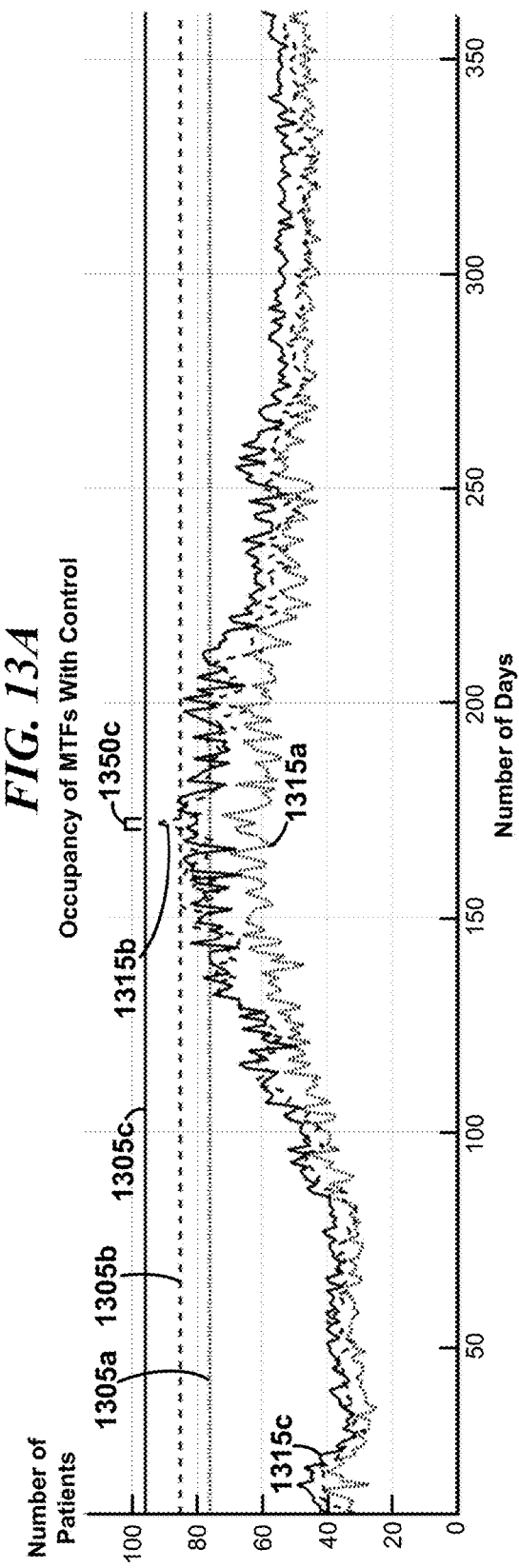
FIG. 13B is a plot of patient occupancy in the healthcare resource allocation digital system simulation of FIG. 13A, but with application of a prototype lifted digital controller implementation of an embodiment as disclosed herein.

After learning the dynamics of the digital controller system represented by the three MTFs and the central logistics system, a prototype implementation of an embodiment provided a single lifted controller control configured to minimize patient occupancy by directing commands from the central logistics system. FIG. 13B plots the resulting occupancies 1315a, 1315b, 1315c (still corresponding to the MTFs with maximum occupancy lines 1305a, 1305b, 1305c, respectively) during application of the single lifted controller. As indicated, by seeking to minimize the average facility occupancy percentage, each hospital incurs fewer periods of near, or complete, full occupancy relative to the result of FIG. 13A. Indeed, save for the single day of overoccupancy by the MTF associated with the plot 1315b (indicated by the reference 1350c), the MTFs did not experience periods of overcapacity. The generated lifted controller in this example determined an appropriate control action for the original logistic system at each time step and directed the movement of patients between different facilities to prevent a subset of facilities from becoming overburdened. Thus, by applying the control signals in feedback, the facilities were prevented from going over capacity for the majority of the time.

Figure 14:
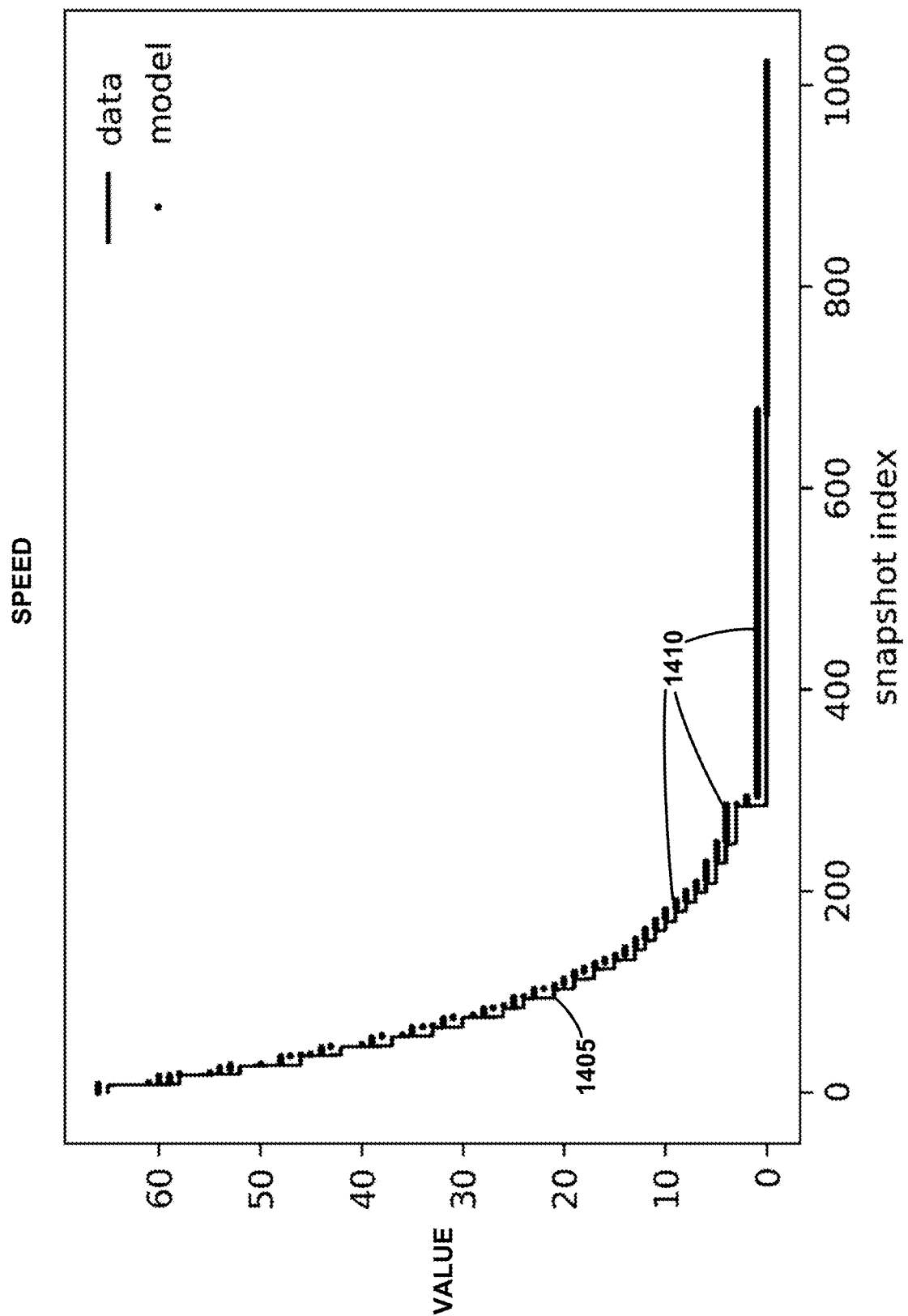
FIG. 14 is a plot comparing actual output values of a vehicle's ECU with the predicted values of a prototype implementation of a lifted digital twin model embodiment as disclosed herein.

As another example to better inform appreciation of various of the disclosed LPCMS and lifted controller embodiments, FIG. 14 plots the predicted performance of a lifted representation of a vehicle's control ECU operation 1410 relative to actual output values of the ECU 1405. As indicated, each of the plots 1405 and 1410 are highly correlated. In this example implementation, the ECU is part of an automatic cruise control system which accelerates the vehicle to a specified speed, slows to follow a lead car, and then must perform an emergency, safe stop procedure in response to the lead car's sudden deceleration to zero speed. The lifted representation was trained using ECU data acquired during from the acceleration and follow portions of the scenario, but not during the deceleration. Here, FIG. 14 depicts the "safe stop" portion of the scenario for which no training data was provided. Having adequately learned the dynamics from the first two portions, one sees in FIG. 14 how the value of the SPEED output signal from the control ECU is still very similar with the predicted value of the speed by the lifted model during the emergency "safe stop."

Example Variations of Certain Disclosed Concepts

The following section summarizes various associated and modified embodiments to those described elsewhere herein.

For example, some of these embodiments contemplate a lifted predictive controller management system comprising a computer system for generating a lifted predictive controller, the computer system comprising: a state decomposition component, the state decomposition component configured to determine a lifted representation of a digital controller system; a state prediction refinement component, the state prediction refinement component configured to assess a sensitivity of the lifted representation to parameters; and a control command planning component, the control command planning component configured to generate control logic based upon one or more objective metrics. In some of these embodiments, the system is applied to event driven systems, and may accordingly be configured to accept CAN messages, SPIO, GPIO messages, extracting and translating these events into a format amenable to the Koopman MPC algorithms for time series. Some of these embodiments may update portions of the time series based upon the values of the discrete event messages. Some of these embodiments may extract a timing model for the discrete events, while some may repackage the outputs of a K-MPC time-series algorithm into discrete messages. Some of these embodiments may publish messages to a queue for consumption by discrete event simulations. Some of these embodiments may employ multiple time-delayed states as observables, may use multiple time-delayed inputs as observables, or may form a time-dependent Koopman model from retraining for use with K-MPC. In some of these embodiments, a logistics system may receive a matrix of inputs that is vectorized before the inputs are used in the model. Some of these embodiments may use a black-swan detection algorithm to trigger retraining of one or more lifted controller's models on the fly during deployment.

Some embodiments contemplate a computer-implemented method for generating a lifted predictive controller, the method comprising: receiving one or more temporal datasets comprising a first set of observables for a plurality of digital controllers; identifying a second set of observables based upon the one or more temporal datasets, the second set of observables associated with a linear representation of a system; generating a lifted controller logic; and publishing the lifted predictive control model and lifted controller logic. Some of these embodiments may receive the temporal data set and delay embedding temporal data set. Some of these embodiments may lift the delay embedded set with explicitly specified observables (e.g., polynomials, radial basis functions, indicator functions, etc.) or implicitly specified observables (e.g., as created with one or more neural networks). In some of these embodiments, the method may further comprise receiving a first temporal dataset for a digital controller, the digital controller comprising a local digital model; receiving a second temporal dataset for the local digital model; creating a digital twin lifted model for the local digital model using the second temporal dataset; creating a lifted controller for the digital controller using the first temporal dataset and the digital twin lifted model.

Some embodiments contemplate a deployed lifted predictive controller comprising a computer system for providing supplemental controls, the computer system comprising: a lifted predictive control model; and a lifted control command planner. In some of these embodiments, for each model, a list of input and output signals may be recorded/saved. In some of these embodiments, digital controllers with compatible inputs or outputs with the models may be "wired" together.

Some embodiments contemplate an aggregate system of deployed lifted predictive controllers, created using a computer-implemented method, the method comprising: identifying a plurality of digital controllers within a digital controller system, wherein, a first digital controller and a second digital controller of the plurality of digital controllers exchange control information, and wherein a third digital controller of the plurality of digital controllers comprises a local digital control model; and creating: a first lifted controller for the first digital controller; a second lifted controller for the second digital controller; a third lifted controller for the first and second digital controller; a fourth lifted controller for the third digital controller; and a digital twin lifted model for the local digital model.

Some embodiments contemplate controls implementations/lifted control command planner creation, specifically, a computer-implemented method for creating a controller to a lifted model, the method comprising: receiving temporal data; acquiring a lifted model; determining a control assessment cost function; solving the linear control problem using the lifted model and the control assessment cost function; determining supplemental Model Predictive Control (MPC) logic for the linear control problem solution, comprising: determining the MPC model's finite prediction horizon; determining the MPC model's cost function; determining the MPC model's optimization algorithm; and appending the MPD model to the linear control problem solution. Some of these embodiments may use multiple time-delayed states as observables, some may use multiple time-delayed inputs as observables, and some may form a time-dependent Koopman model from retraining that is used with K-MPC. Some of these embodiments may include a logistics system configured to receive a matrix of inputs that is vectorized before the inputs are used in the model. Some of these embodiments contemplate black-swan detection which will trigger retraining of the lifted control model on the fly once deployed.

Some embodiments contemplate model interpolation implementations for controls, such as a computer-implemented method for providing a lifted system model, the method comprising: receiving a set of parameter values; determining a nearest neighbor set of lifted models to the set of parameter values from a parameter-based index; generating an interpolated lifted model from the nearest neighbor set of lifted models.

Some embodiments contemplate online operations for a lifted predictive control management system, particularly comprising a computer-implemented method for managing a lifted predictive controller deployment, the method comprising: acquiring temporal data from one or more digital controller systems; determining, based upon the temporal data, that a cool-down period is to be enacted; and directing one or more lifted predictive controllers to defer issuing control commands during the cool-down period. In some of these embodiments, the computer-implemented method includes black-swan detection which will trigger retraining of the lifted controller model on the fly during deployment.

Some embodiments contemplate a computer implemented method comprising: determining robustness of balanced sets of simulation data, wherein determining robustness comprises: selecting an observable parameter set yielding a simulation within a threshold of accuracy as measured by one or more objective functions and/or metrics using corresponding lifted representations; performing a sensitivity analysis upon the objective functions and/or metrics using one or more neural network Koopman operator models parametrized by input parameters; and determining whether the objective functions and/or metrics are robust to small changes in parameters.

Computer System

Figure 15:
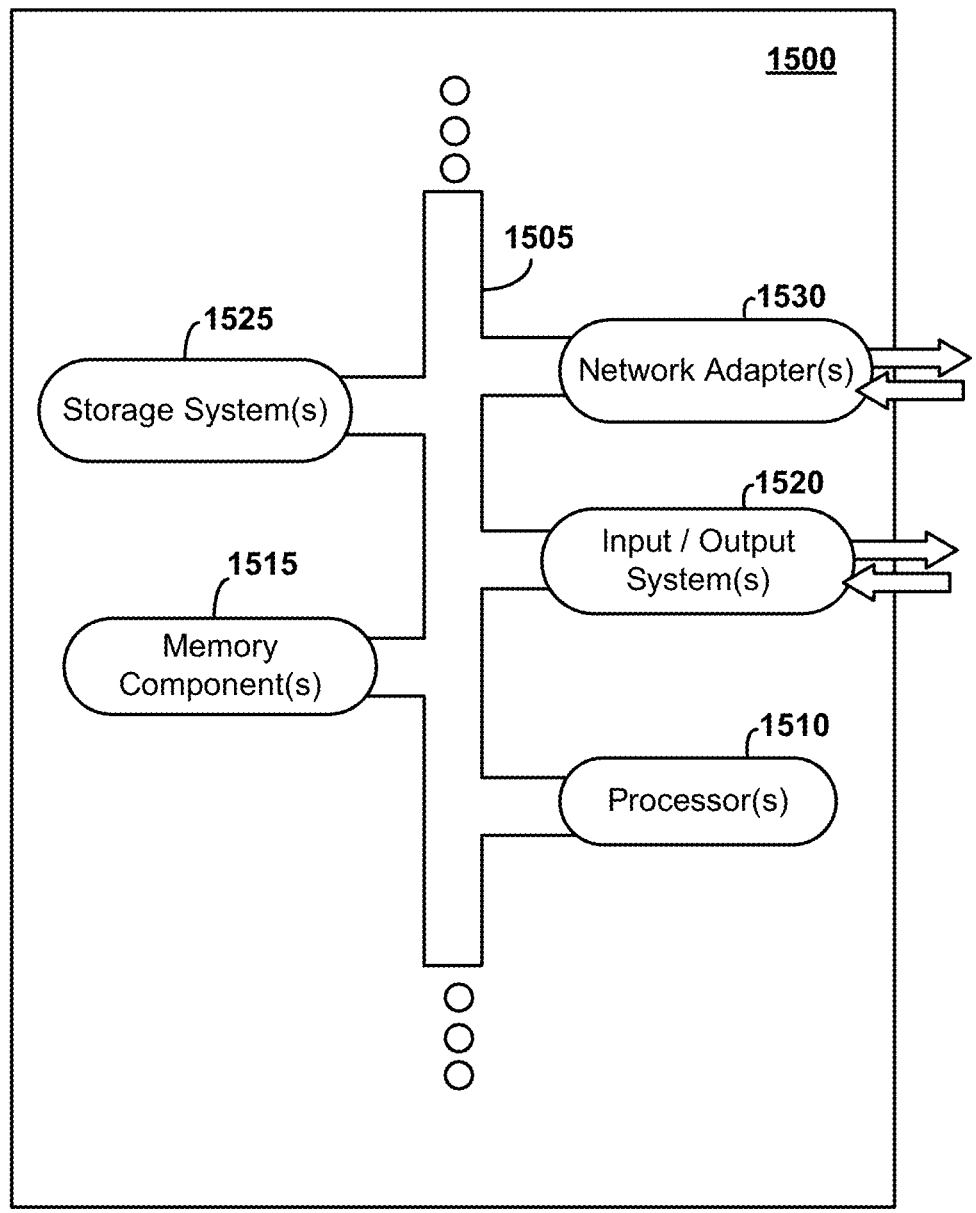
FIG. 15 is a block diagram of an example computer system as may be used in conjunction with some of the embodiments.

FIG. 15 is a block diagram of an example computer system as may be used in conjunction with some of the embodiments. The computing system 1500 may include an interconnect 1505, connecting several components, such as, e.g., one or more processors 1510, one or more memory components 1515, one or more input/output systems 1520, one or more storage systems 1525, one or more network adaptors 1530, etc. The interconnect 1505 may be, e.g., one or more bridges, traces, busses (e.g., an ISA, SCSI, PCI, I2C, Firewire bus, etc.), wires, adapters, or controllers.

The one or more processors 1510 may include, e.g., an Intel™ processor chip, a math coprocessor, a graphics processor, etc. The one or more memory components 1515 may include, e.g., a volatile memory (RAM, SRAM, DRAM, etc.), a non-volatile memory (EPROM, ROM, Flash memory, etc.), or similar devices. The one or more input/output devices 1520 may include, e.g., display devices, keyboards, pointing devices, touchscreen devices, etc. The one or more storage devices 1525 may include, e.g., cloud-based storages, removable Universal Serial Bus (USB) storage, disk drives, etc. In some systems memory components 1515 and storage devices 1525 may be the same components. Network adapters 1530 may include, e.g., wired network interfaces, wireless interfaces, Bluetooth™ adapters, line-of-sight interfaces, etc.

One will recognize that only some of the components, alternative components, or additional components than those depicted in FIG. 15 may be present in some embodiments. Similarly, the components may be combined or serve dual-purposes in some systems. The components may be implemented using special-purpose hardwired circuitry such as, for example, one or more ASICs, PLDs, FPGAs, etc. Thus, some embodiments may be implemented in, for example, programmable circuitry (e.g., one or more microprocessors) programmed with software and/or firmware, or entirely in special-purpose hardwired (non-programmable) circuitry, or in a combination of such forms.

In some embodiments, data structures and message structures may be stored or transmitted via a data transmission medium, e.g., a signal on a communications link, via the network adapters 1530. Transmission may occur across a variety of mediums, e.g., the Internet, a local area network, a wide area network, or a point-to-point dial-up connection, etc. Thus, "computer readable media" can include computer-readable storage media (e.g., "non-transitory" computer-readable media) and computer-readable transmission media.

The one or more memory components 1515 and one or more storage devices 1525 may be computer-readable storage media. In some embodiments, the one or more memory components 1515 or one or more storage devices 1525 may store instructions, which may perform or cause to be performed various of the operations discussed herein. In some embodiments, the instructions stored in memory 1515 can be implemented as software and/or firmware. These instructions may be used to perform operations on the one or more processors 1510 to carry out processes described herein. In some embodiments, such instructions may be provided to the one or more processors 1510 by downloading the instructions from another system, e.g., via network adapter 1530.

Remarks

The drawings and description herein are illustrative. Consequently, neither the description nor the drawings should be construed so as to limit the disclosure. For example, titles or subtitles have been provided simply for the reader's convenience and to facilitate understanding. Thus, the titles or subtitles should not be construed so as to limit the scope of the disclosure, e.g., by grouping features which were presented in a particular order or together simply to facilitate understanding. Unless otherwise defined herein, all technical and scientific terms used herein have the same meaning as commonly understood by one of ordinary skill in the art to which this disclosure pertains. In the case of conflict, this document, including any definitions provided herein, will control. A recital of one or more synonyms herein does not exclude the use of other synonyms. The use of examples anywhere in this specification including examples of any term discussed herein is illustrative only and is not intended to further limit the scope and meaning of the disclosure or of any exemplified term.

Similarly, despite the particular presentation in the figures herein, one skilled in the art will appreciate that actual data structures used to store information may differ from what is shown. For example, the data structures may be organized in a different manner, may contain more or less information than shown, may be compressed and/or encrypted, etc. The drawings and disclosure may omit common or well-known details in order to avoid confusion. Similarly, the figures may depict a particular series of operations to facilitate understanding, which are simply exemplary of a wider class of such collection of operations. Accordingly, one will readily recognize that additional, alternative, or fewer operations may often be used to achieve the same purpose or effect depicted in some of the flow diagrams. For example, data may be encrypted, though not presented as such in the figures, items may be considered in different looping patterns ("for" loop, "while" loop, etc.), or sorted in a different manner, to achieve the same or similar effect, etc.

Reference herein to "an embodiment" or "one embodiment" means that at least one embodiment of the disclosure includes a particular feature, structure, or characteristic described in connection with the embodiment. Thus, the phrase "in one embodiment" in various places herein is not necessarily referring to the same embodiment in each of those various places. Separate or alternative embodiments may not be mutually exclusive of other embodiments. One will recognize that various modifications may be made without deviating from the scope of the embodiments.

We claim:

1. A computer-implemented method for deploying controller logic, the method comprising:
   determining a selection of observables resulting in a substantially linear characterization of one or more digital controller systems;
   determining controller logic, the controller logic configured to:
      predict a future state of the one or more digital controller systems, at least in part, by evolving a simulated state of the one or more digital controller systems using the selection of observables resulting in the substantially linear characterization of the one or more digital controller systems;
      determine an adjustment based upon the predicted future state and an objective metric; and
      provide, based upon the determined adjustment, control commands recognized by the one or more digital controller systems to the one or more digital controller systems; and
   causing the controller logic to be deployed to control the one or more digital controller systems.

2. The computer-implemented method of claim 1, wherein determining the selection of observables resulting in the substantially linear characterization of the one or more digital controller systems comprises:
   training a neural network to learn:
      a selection of at least a portion of a dictionary of observables for the one or more digital controller systems; and
      a Koopman operator matrix representation for the one or more digital controller systems.

3. The computer-implemented method of claim 2, wherein the neural network is an ensemble neural network, the ensemble neural network comprising:
   a first neural network configured to determine the selection of at least the portion of the dictionary of observables;
   a second neural network configured to determine the Koopman operator matrix representation as a Koopman mapping; and
   a third neural network configured to determine a mapping from the dictionary of observables to a predicted state of the one or more digital controller systems, and wherein,
   training the ensemble neural network comprises updating at least a portion of the ensemble neural network using an optimizer based, at least in part, upon output from the second neural network.

4. The computer-implemented method of claim 3, wherein,
   the one or more digital controller systems comprises an Electronic Control Unit (ECU), and wherein,
   data provided to the ensemble neural network during training comprises:
      multiple time-delayed states of the ECU; and
      multiple time-delayed inputs to the ECU, the multiple time-delayed inputs to the ECU derived from one or more of:
         Control Area Network (CAN) messages;
         Serial Peripheral Interface (SPI) messages; and
         General Purpose Input/Output (GPIO) messages.

5. The computer-implemented method of claim 4, wherein,
   the controller logic is further configured to repackage outputs of a time-series algorithm implemented by Model Predictive Control (MPC) logic configured to operate upon the substantially linear characterization of the one or more digital controller systems into one or more of:
      Control Area Network (CAN) messages;
      Serial Peripheral Interface (SPI) messages; and
      General Purpose Input/Output (GPIO) messages.

6. The computer-implemented method of claim 3, the method further comprising:
   acquiring temporal data from the controller logic after deployment;
   determining, based upon the temporal data, that an accuracy of the substantially linear characterization is outside a threshold;
   in response to determining that the accuracy of the substantially linear characterization is outside the threshold, directing the lifted controller logic to defer issuing control commands during a cool-down period;
   determining an updated selection of observables resulting in an updated substantially linear characterization of the one or more digital controller systems;
   determining an updated controller logic of the one or more digital controller systems based upon the updated selection of observables; and
   causing the deployed controller logic to be replaced with the updated controller logic.

7. The computer-implemented method of claim 6, wherein, the substantially linear characterization comprises a plurality of substantially linear characterizations, each of the plurality of substantially linear characterizations indexed to one of a plurality of parameter configurations for the one or more digital controller systems, wherein,
   determining, based upon the temporal data, that an accuracy of the substantially linear characterization relative to the one or more digital controller systems is outside a threshold, comprises determining that accuracies associated with a subset of the plurality of substantially linear characterizations are outside the threshold, wherein,
   determining the updated selection of observables resulting in the updated substantially linear characterization of the one or more digital controller systems comprises determining an updated plurality of selections of observables resulting in updated substantially linear characterizations, and wherein,
   the method further comprises causing the subset of the plurality of substantially linear characterizations to be replaced with the updated plurality of substantially linear characterizations.

8. The computer-implemented method of claim 7, wherein determining the updated controller logic comprises:
   determining a nearest neighbor set of substantially linear characterizations to the set of parameter configurations from a parameter-based index; and
   generating an interpolated substantially linear characterization from the nearest neighbor set of substantially linear characterizations.

9. The computer-implemented method of claim 1, wherein determining the selection of observables resulting in the substantially linear characterization of the one or more digital controller systems comprises receiving the selection of observables and the substantially linear characterization of the one or more digital controller systems.

10. The computer-implemented method of claim 1, wherein determining the selection of observables resulting in a substantially linear characterization of the one or more digital controller systems comprises receiving the selection of observables.

11. A non-transitory computer-readable medium comprising instructions configured to cause one or more computer systems to perform a method, the method comprising:
   determining a selection of observables resulting in a substantially linear characterization of one or more digital controller systems;
   determining controller logic, the controller logic configured to:
      predict a future state of the one or more digital controller systems, at least in part, by evolving a simulated state of the one or more digital controller systems using the selection of observables resulting in the substantially linear characterization of the one or more digital controller systems;
      determine an adjustment based upon the predicted future state and an objective metric; and
      provide, based upon the determined adjustment, control commands recognized by the one or more digital controller systems to the one or more digital controller systems; and
   causing the controller logic to be deployed to control the one or more digital controller systems.

12. The non-transitory computer-readable medium of claim 11, wherein determining the selection of observables resulting in the substantially linear characterization of the one or more digital controller systems comprises:
training a neural network to learn:
a selection of at least a portion of a dictionary of observables for the one or more digital controller systems; and
a Koopman operator matrix representation for the one or more digital controller systems.

13. The non-transitory computer-readable medium of claim 12, wherein the neural network is an ensemble neural network, the ensemble neural network comprising:
a first neural network configured to determine the selection of at least the portion of the dictionary of observables;
a second neural network configured to determine the Koopman operator matrix representation as a Koopman mapping; and
a third neural network configured to determine a mapping from the dictionary of observables to a predicted state of the one or more digital controller systems, and wherein,
training the ensemble neural network comprises updating at least a portion of the ensemble neural network using an optimizer based, at least in part, upon output from the second neural network.

14. The non-transitory computer-readable medium of claim 13, wherein,
the one or more digital controller systems comprises an Electronic Control Unit (ECU), and wherein,
data provided to the ensemble neural network during training comprises:
multiple time-delayed states of the ECU; and
multiple time-delayed inputs to the ECU, the multiple time-delayed inputs to the ECU derived from one or more of:
Control Area Network (CAN) messages;
Serial Peripheral Interface (SPI) messages; and
General Purpose Input/Output (GPIO) messages, and wherein,
the controller logic is further configured to repackage outputs of a time-series algorithm implemented by Model Predictive Control (MPC) logic configured to operate upon the substantially linear characterization of the one or more digital controller systems into one or more of:
Control Area Network (CAN) messages;
Serial Peripheral Interface (SPI) messages; and
General Purpose Input/Output (GPIO) messages.

15. The non-transitory computer-readable medium of claim 13, the method further comprising:
acquiring temporal data from the controller logic after deployment;
determining, based upon the temporal data, that an accuracy of the substantially linear characterization is outside a threshold;
in response to determining that the accuracy of the substantially linear characterization is outside the threshold, directing the controller logic to defer issuing control commands during a cool-down period;
determining an updated selection of observables resulting in an updated substantially linear characterization of the one or more digital controller systems;
determining an updated controller logic of the one or more digital controller systems based upon the updated selection of observables; and
causing the deployed controller logic to be replaced with the updated controller logic.

16. The non-transitory computer-readable medium of claim 15, wherein, the substantially linear characterization comprises a plurality of substantially linear characterizations, each of the plurality of substantially linear characterizations indexed to one of a plurality of parameter configurations for the one or more digital controller systems, wherein,
determining, based upon the temporal data, that an accuracy of the substantially linear characterization relative to the one or more digital controller systems is outside a threshold, comprises determining that accuracies associated with a subset of the plurality of substantially linear characterizations are outside the threshold, wherein,
determining the updated selection of observables resulting in the substantially linear characterization of the one or more digital controller systems comprises determining an updated plurality of selections of observables resulting in updated substantially linear characterizations, and wherein,
the method further comprises causing the subset of the plurality of substantially linear characterizations to be replaced with the updated plurality of substantially linear characterizations.

17. The non-transitory computer-readable medium of claim 11, wherein determining the selection of observables resulting in a substantially linear characterization of the one or more digital controller systems comprises receiving the selection of observables and the substantially linear characterization of the one or more digital controller systems.

18. The non-transitory computer-readable medium of claim 11, wherein determining the selection of observables resulting in a substantially linear characterization of the one or more digital controller systems comprises receiving the selection of observables.

19. A computer system comprising:
at least one processor; and
at least one memory, the at least one memory comprising instructions configured the cause the computer system to perform a method, the method comprising:
determining a selection of observables resulting in a substantially linear characterization of one or more digital controller systems;
determining controller logic, the controller logic configured to:
predict a future state of the one or more digital controller systems, at least in part, by evolving a simulated state of the one or more digital controller systems using the selection of observables resulting in the substantially linear characterization of the one or more digital controller systems;
determine an adjustment based upon the predicted future state and an objective metric; and
provide, based upon the determined adjustment, control commands recognized by the one or more digital controller systems to the one or more digital controller systems; and
causing the controller logic to be deployed to control the one or more digital controller systems.

20. The computer system of claim 19, wherein determining the selection of observables resulting in the substantially linear characterization of the one or more digital controller systems comprises:
training a neural network to learn:

a selection of at least a portion of a dictionary of observables for the one or more digital controller systems; and a Koopman operator matrix representation for the one or more digital controller systems.

21. The computer system of claim 20, wherein the neural network is an ensemble neural network, the ensemble neural network comprising:

a first neural network configured to determine the selection of at least the portion of the dictionary of observables;

a second neural network configured to determine the Koopman operator matrix representation as a Koopman mapping; and a third neural network configured to determine a mapping from the dictionary of observables to a predicted state of the one or more digital controller systems, and wherein, training the ensemble neural network comprises updating at least a portion of the ensemble neural network using an optimizer based, at least in part, upon output from the second neural network.

22. The computer system of claim 21, wherein, the one or more digital controller systems comprises an Electronic Control Unit (ECU), and wherein, data provided to the ensemble neural network during training comprises:

multiple time-delayed states of the ECU; and multiple time-delayed inputs to the ECU, the multiple time-delayed inputs to the ECU derived from one or more of:

Control Area Network (CAN) messages;

Serial Peripheral Interface (SPI) messages; and

General Purpose Input/Output (GPIO) messages, and wherein, the controller logic is further configured to repackage outputs of a time-series algorithm implemented by Model Predictive Control (MPC) logic configured to operate upon the substantially linear characterization of the one or more digital controller systems into one or more of:

Control Area Network (CAN) messages;

Serial Peripheral Interface (SPI) messages; and

General Purpose Input/Output (GPIO) messages.

23. The computer system of claim 21, the method further comprising:

acquiring temporal data from the lifted-controller logic after deployment;

determining, based upon the temporal data, that an accuracy of the substantially linear characterization is outside a threshold;

in response to determining that the accuracy of the substantially linear characterization is outside the threshold, directing the controller logic to defer issuing control commands during a cool-down period;

determining an updated selection of observables resulting in an updated substantially linear characterization of the one or more digital controller systems;

determining an updated controller logic of the one or more digital controller systems based upon the updated selection of observables; and causing the deployed fitted controller logic to be replaced with the updated fitted controller logic.

24. The computer system of claim 23, wherein, the substantially linear characterization comprises a plurality of substantially linear characterizations, each of the plurality of substantially linear characterizations indexed to one of a plurality of parameter configurations for the one or more digital controller systems, wherein, determining, based upon the temporal data, that an accuracy of the substantially linear characterization relative to the one or more digital controller systems is outside a threshold, comprises determining that accuracies associated with a subset of the plurality of substantially linear characterizations are outside the threshold, wherein, determining the updated selection of observables resulting in the updated substantially linear characterization of the one or more digital controller systems comprises determining an updated plurality of selections of observables resulting in updated substantially linear characterizations, and wherein, the method further comprises causing the subset of the plurality of substantially linear characterizations to be replaced with the updated plurality of substantially linear characterizations.

25. The computer system of claim 19, wherein determining the selection of observables resulting in a substantially linear characterization of the one or more digital controller systems comprises receiving the selection of observables and the substantially linear characterization of the one or more digital controller systems.

26. The computer system of claim 19, wherein determining the selection of observables resulting in a substantially linear characterization of the one or more digital controller systems comprises receiving the selection of observables.

* * * * *